United States Patent
Mandal et al.

(10) Patent No.: US 10,033,532 B2
(45) Date of Patent: Jul. 24, 2018

(54) BIOMETRIC BASED AUTHENTICATED KEY EXCHANGE

(71) Applicant: FUJITSU LIMITED, Kawasaki-shi, Kanagawa (JP)

(72) Inventors: Avradip Mandal, San Jose, CA (US); Hart Montgomery, Redwood City, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/745,398

(22) Filed: Jun. 20, 2015

(65) Prior Publication Data

US 2016/0373417 A1 Dec. 22, 2016

(51) Int. Cl.
- *H04L 9/32* (2006.01)
- *H04L 9/08* (2006.01)
- *H04L 9/30* (2006.01)

(52) U.S. Cl.
CPC .......... *H04L 9/3231* (2013.01); *H04L 9/0844* (2013.01); *H04L 9/3073* (2013.01); *H04L 2209/34* (2013.01)

(58) Field of Classification Search
CPC ....... H04L 63/06; H04L 63/061; H04L 63/08; H04L 63/0861; H04L 63/0884; H04L 9/08; H04L 9/0838; H04L 9/0841; H04L 9/0844; H04L 9/0861; H04L 9/30; H04L 9/304; H04L 9/32; H04L 9/321; H04L 9/3226; H04L 9/3231; H04L 9/3236; H04L 9/3242; H04W 12/04; H04W 12/06

See application file for complete search history.

(56) References Cited

U.S. PATENT DOCUMENTS

| | | | | |
|---|---|---|---|---|
| 2009/0064296 | A1* | 3/2009 | Aikawa | G06F 21/32 726/6 |
| 2012/0300930 | A1* | 11/2012 | Jutla | H04L 9/0844 380/262 |

(Continued)

OTHER PUBLICATIONS

Gennaro et al., A Framework for Password-Based Authenticated Key Exchange, 2003, International Association for Cryptologic Reasearch, Eurocrypt 2003, LNCS 2656, pp. 524-543.*

(Continued)

*Primary Examiner* — Jung Kim
*Assistant Examiner* — Adrian Stoica
(74) *Attorney, Agent, or Firm* — Maschoff Brennan

(57) ABSTRACT

A method includes receiving a first biometric data set representative of a first biometric sample provided by a user and public parameters. The method includes generating a first set of exchange information based thereon and communicating it to a system server. The method includes receiving a second set of exchange information based on the public parameters and a second biometric data set representative of a second biometric sample and is symmetric with respect to the first set of exchange information. The method includes computing a session key for the communication session by applying a first hash function based on a hash key to a subset of the second set of exchange information and a second hash function based on a projected key to a subset of the first set of exchange information. The method includes using the session key in communications during the communication session.

18 Claims, 4 Drawing Sheets

(56) References Cited

U.S. PATENT DOCUMENTS

| | | | | |
|---|---|---|---|---|
| 2013/0174243 | A1* | 7/2013 | Inatomi | H04L 9/3231 |
| | | | | 726/7 |
| 2015/0082024 | A1* | 3/2015 | Smith | H04L 63/0428 |
| | | | | 713/155 |
| 2016/0048670 | A1* | 2/2016 | Kim | G06K 9/00073 |
| | | | | 382/117 |

OTHER PUBLICATIONS

Odelu et al., Cryptanalysis on 'Robust Biometrics-Based Authentication Scheme for Multi-server Environment', 2014, Cryptology ePrint Archive, retrieved from https//eprint.iacr.org/2014/715.*

Katz et al., Smooth Projective Hashing and Password-Based Authenticated Key Exchange from Latices, 2009, International Association for Cryptologic Research, ASIACRYPT 2009, LNCS 5912, pp. 636-652.*

Dodis et al. Robust Fuzzy Extractors and Authenticated Key Agreement from Close Secrets, 2010, retrieved from https://www.cs.nyu.edu/~dodis/ps/ake-close.pdf.*

U.S. Appl. No. 14/287,051, filed May 25, 2014.

Benhamouda, F. et al., New Techniques for SPHF's and efficient one-round PAKE protocols, pp. 449-475, 2013.

Boyen, X. et al., Secure remote authentication using biometric data, pp. 147-163, 2005.

Bellovin, S. et al., Encrypted key exchange: Password-based protocols secure against dictionary attacks, pp. 72-84, 1992.

Boyko, V., et al., Provably secure password-authenticated key exchange using Diffie-Hellman, pp. 156-171, 2000.

Boyen, X., Reusable cryptographic fuzzy extractors, pp. 82-91, 2004.

Bellare, M. et al, Authenticated key exchange secure against dictionary attacks, pp. 139-155, 2000.

Bonneau, J. et al., Towards reliable storage of 56-bit secrets in human memory. In Proceedings of the 23rd USENIX Security Symposium, Aug. 2014.

Canetti, R., Universally composable security: A new paradigm for cryptographic protocols, pp. 136-145, 2001.

Cramer, R. et al., Universal hash proofs and a pradigm for adaptive chosen ciphertext secure public-key encryption, pp. 45-64, 2002.

Dodis, Y. et al., Fuzzy extractors: How to generate strong keys from biometrics and other noisy data, pp. 523-540, 2004.

Goldwasser, S. et al., Probalistic encryption. Journal of Computer and System Sciences, 28(2):270-299, 1984.

* cited by examiner

BIOMETRIC BASED AUTHENTICATED KEY EXCHANGE

FIELD

The embodiments discussed herein are related to biometric-based authenticated key exchange.

BACKGROUND

Password authenticated key exchange (PAKE) is a studied cryptographic topic. However, PAKE is limited to implementations in which two parties participating in the PAKE share an exact secret. From the exact secret, the keys are generated and exchanged.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of biometric authenticated key exchange for a communication session between a computing system and a system server that includes receiving at the computing system, a first biometric data set that is representative of a first biometric sample provided by a user. The method includes receiving, from a trusted third party server, one or more public parameters. Based on the public parameters and the first biometric data set, the method includes generating, at the computing system, a first set of exchange information. The method includes communicating, by the computing system, the first set of exchange information to the system server. The method includes receiving from the system server, a second set of exchange information. The second set of exchange information is based on one or more of the public parameters and a second biometric data set that is representative of a second biometric sample provided by the user and is symmetric with respect to the first set of exchange information. The method includes computing a session key for the communication session. The computing includes applying a first hash function based on a hash key generated at the computing system to a subset of the second set of exchange information and applying a second hash function based on a projected key generated at the system server to a subset of the first set of exchange information. The method includes using the session key in communications between the computing system and the system server during the communication session.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Password authenticated key exchange (PAKE) has been a useful and widely studied cryptographic topic. However, PAKE only functions when the two parties participating share an exact secret. Accordingly, some embodiments described herein relate to a biometric authenticated key exchange (BAKE) scheme. The BAKE scheme includes a protocol that allows two entities to agree on a secret session key when the only secret information the entities share is noisy, low-entropy data such as biometric data. The BAKE scheme discussed herein is constructed in the universal composability (UC) framework.

The BAKE scheme includes reasonable assumptions on the biometric data. For example, the BAKE scheme is functional so long as the "noise" or differences in the biometric data are relatively independent of meaningful content (e.g., biometric characteristics) of the biometric data. Using the BAKE scheme, session keys may be computed that may be used in communication between the entities.

Some additional details of these and other embodiments are discussed with respect to the appended figures in which commonly labeled items indicate similar structure unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1:
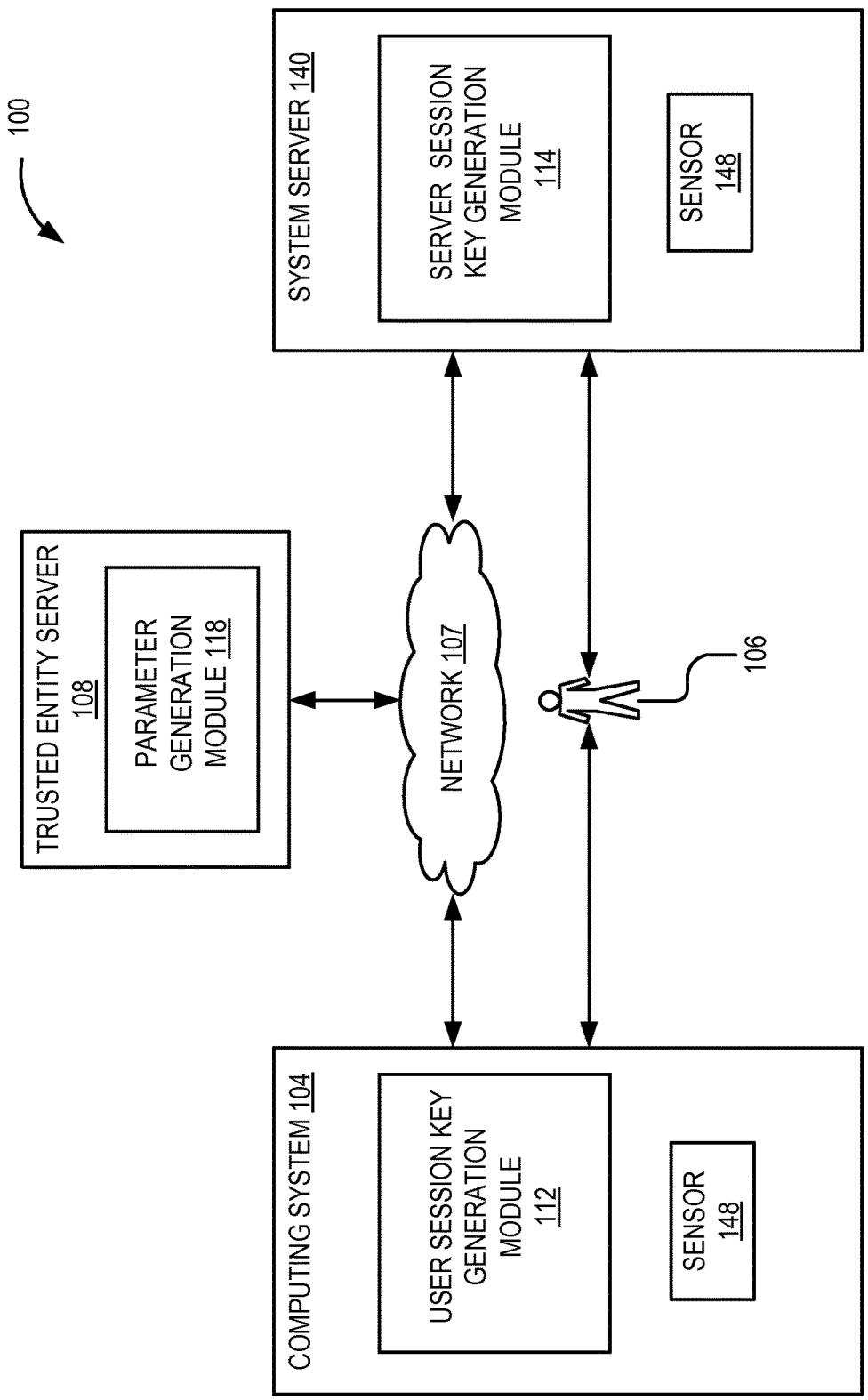
FIG. 1 is a block diagram of an example operating environment.

FIG. 1 illustrates a block diagram of an example operating environment 100, arranged in accordance with at least one embodiment described herein. In the operating environment 100, an authenticated key exchange may occur between a computing system 104 and a system server 140. The authenticated key exchange may be based on biometric samples provided by a user 106. The authenticated key exchange may include generation of a secret session key by each of the computing system 104 and the system server 140.

The authenticated key exchange may be based on a biometric authenticated key exchange (BAKE) scheme as described in this disclosure. The BAKE scheme allows for the computing system 104 and the system server 140 to agree on the secret session key when the only secret information shared between the computing system 104 and the system server 140 is biometric data sets representative of biometric samples of the user 106. The BAKE scheme may be applicable in other operating environments in which other noisy, low-entropy data sets are the secret information between the computing system 104 and the system server 140. Additionally or alternatively, the BAKE scheme may be applicable in operating environments in which the secret information includes the noisy, low-entropy data sets and an exact data set. For example, the noisy, low-entropy data sets may include a biometric data set and the exact data set may include a password.

Generally, a trusted entity server 108 may be configured to generate public parameters. The public parameters may include two public keys and a common random string (CRS). One or more of the public parameters may be generated for multiple sessions. For example, one or more of the public parameters may be generated each year or each month.

The computing system 104 and the system server 140 may receive the public parameters from the trusted entity server 108 or may access the public parameters. In addition, the computing system 104 and the system server 140 may each receive biometric data sets and a shared session identifier. The biometric data sets may be slightly different because of the nature of biometric samples. However, the biometric data sets may be similar enough to verify that the biometric samples both originate at the user 106. For example, the computing system 104 may receive a first biometric data set that is representative of a first biometric sample of the user 106. The system server 140 may receive a second biometric data set that is representative of a second biometric sample of the user 106.

Based on one of the biometric data sets and the public parameters, the computing system 104 may generate a first set of exchange information. Similarly, the system server 140 may generate a second set of exchange information based on other of the biometric data sets and the public parameters.

The sets of exchange information may be exchanged. For example, the computing system 104 may communicate the first set of exchange information to the system server 140 and vice versa. In response to receipt of the set of exchange information, the session secret key may be evaluated based on one or more parameters of the set of exchange information, the public parameters, and the shared session identifier. The computing system 104 and the system server 140 may use the session secret key for communications therebetween. For one or more other communication sessions, another session secret key and/or another shared session identifier may be generated and exchanged in another authentication key exchange. Some additional details of the BAKE scheme from which the public parameters are generated and according to which the evaluation of the session secret key are generated are provided elsewhere in this disclosure.

The operating environment 100 includes the computing system 104 that may be associated with the user 106, the trusted entity server 108, the system server 140 that may also be associated with the user 106, and a network 107. The computing system 104, the trusted entity server 108, and the system server 140 (collectively, "environment components") may be communicatively coupled via the network 107. The environment components may communicate data and information used in an authenticated key exchange via the network 107. Each of the environment components are briefly described in the following paragraphs.

The network 107 may include a wired network, a wireless network, or any combination thereof. The network 107 may include any suitable configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The trusted entity server 108 may include a processor-based computing system. For example, the trusted entity server 108 may include a hardware server or another processor-based computing system configured to function as a server. The trusted entity server 108 may include memory and network communication capabilities. In the operating environment 100, the trusted entity server 108 may be configured to communicate with the computing system 104, and the system server 140 via the network 107.

The trusted entity server 108 may be associated with a trusted entity. For example, the trusted entity may include a non-interested third party such as a certification authority. The user 106 and an entity associated with the system server 140 may trust, select, and agree upon the trusted entity.

The trusted entity server 108 may include a parameter generation module 118. The parameter generation module 118 may be configured to public parameters used in the authenticated key exchange. In some embodiments, the public parameters may include one or more public keys, a CRS, an error correcting code (ECC), a smooth projective hash function for one of the public keys, other parameters discussed elsewhere herein, or some combination thereof. The public parameters generated by the parameter generation module 118 may be communicated to the computing system 104 and the system server 140 or made available via the network 107.

The parameter generation module 118 may be implemented using hardware including a processor, a microprocessor (e.g., to perform or control performance of one or more operations), a field-programmable gate array (FPGA), or an application-specific integrated circuit (ASIC). In some other instances, the parameter generation module 118 may be implemented using a combination of hardware and software. Implementation in software may include rapid activation and deactivation of one or more transistors or transistor elements such as may be included in hardware of a computing system (e.g., the trusted entity server 108, the system server 140, and the computing system 104). Additionally, software defined instructions may operate on information within transistor elements. Implementation of software instructions may at least temporarily reconfigure electronic pathways and transform computing hardware.

In the embodiment depicted in FIG. 1, the user 106 may include an individual. The user 106 may provide one or more biometric samples to the computing system 104 and the system server 140. The biometric samples may include fingerprints of the user 106, iris reading of the user 106, veins of the user 106, samples of sections of deoxyribonucleic acid (DNA) of the user 106, and the like. The biometric samples may be converted to biometric data sets that are representative of the biometric samples. There may be some variation from one biometric sample to the next (e.g., a biometric subsequently provided by the user 106). The biometric samples may, however, include one or more characteristics that are unique or substantially unique to the user 106. Accordingly, the biometric data sets representative of the biometric samples may include some data that represents the noise or differences between the biometric samples and another part of the data may be representative of the characteristics that are substantially unique to the user 106. The biometric data set may include a graphical representation and/or algorithmic representation of the biometric sample, for example.

In some embodiments, the computing system 104 and/or the system server 140 may include a sensor 148. The sensor 148 may include a hardware device, for instance, that is configured to measure or otherwise capture a biometric sample used in an authenticated key exchange. When the biometric sample of the user 106 is measured or otherwise captured, the computing system 104 may generate the biometric data set.

Some examples of the sensor 148 may include: a fingerprint scanner; a camera configured to capture an image of an iris; a device configured to measure the DNA of the user 106; a heart rate monitor configured to capture the heart rate; a wearable electromyography sensor configured to capture the electrical activity produced by the skeletal muscles; or any other sensor 148 configured to measure or otherwise capture a biometric sample.

In some embodiments, the sensor 148 may be included in another device or system that may generate the biometric data set and communicate it to the computing system 104 and/or the system server 140. For example, the device or system that includes the sensor 148 may communicate the biometric data set via the network 107.

In some other embodiments, the user 106 may include another entity such as a corporate entity, governmental entity, and the like. In these and other embodiments, instead of the user 106 providing the biometric sample, the user 106 may provide another type of noisy data. For example, the noisy data may include a password with an error (e.g., a capital letter substituted for a lowercase letter or a zero ('0') substituted for an o ('O')) or another type of noisy data.

The user 106 may be associated with the computing system 104 and/or the system server 140 in some embodiments. For example, the user 106 may own or regularly operate the computing system 104 and/or the system server 140. In some embodiments, the user 106 may not be specifically associated with the computing system 104 and/or the system server 140. For example, the computing system 104 and/or the system server 140 may be publically accessible to multiple users including the user 106.

The computing system 104 may include a processor-based computing system. The computing system 104 may include memory, a processor, and network communication capabilities. In the operating environment 100, the computing system 104 may be capable of communicating data and information to the system server 140 via the network 107. Some examples of the computing system 104 may include a mobile phone, a smartphone, a tablet computer, a laptop computer, a desktop computer, a set-top box, or a connected device (e.g., a smartwatch, smart glasses, a smart pedometer, or any other network-connectable device).

The computing system 104 or a subsystem thereof may provide input, such as the biometric data set, to the user session key generation module (user generation module) 112. For example, the user 106 may operate a component of the computing system 104 to provide a biometric sample to the user generation module 112. Additionally, the user generation module 112 may receive a set of exchange information from the system server 140.

The user generation module 112 may be configured to generate a set of exchange information according to the BAKE scheme and based on the public parameters generated by the parameter generation module 118. For example, the user generation module 112 may be configured to receive or access one or more public keys and CRS generated at the parameter generation module 118.

In addition, the user generation module 112 may receive a set of exchange information from the system server 140.

After receiving the set of exchange information, the user generation module 112 may compute a session key. Computing the session key may include applying a first hash function based on a hash key generated at the computing system 104 to a subset of the second set of exchange information 204 (shown on FIG. 2) and applying a second hash function based on a projected key generated at the system server 140 to a subset of the first set of exchange information 214 (shown on FIG. 2). Some additional details of evaluation of the session key are provided elsewhere in this disclosure.

The user generation module 112 may be implemented using hardware including a processor, a microprocessor (e.g., to perform or control performance of one or more operations), an FPGA, or an ASIC. In some other instances, the user generation module 112 may be implemented using a combination of hardware and software. Implementation in software may include rapid activation and deactivation of one or more transistors or transistor elements such as may be included in the hardware of a computing system (e.g., the trusted entity server 108, the system server 140, and the computing system 104). Additionally, software defined instructions may operate on information within transistor elements. Implementation of software instructions may at least temporarily reconfigure electronic pathways and transform computing hardware.

The system server 140 may include a processor-based computing device. For example, the system server 140 may include a hardware server or another processor-based computing device configured to function as a server. The system server 140 may include memory and network communication capabilities. In the operating environment 100, the system server 140 may be configured to communicate with the computing system 104, and the trusted entity server 108 via the network 107.

The system server 140 or a subsystem thereof may provide input, such as the biometric data set, to a server session key generation module (server generation module) 114. The server generation module 114 may operate substantially similarly to the user generation module 112. Additionally, the BAKE scheme may be symmetric. Accordingly, some or all of the functions described with respect to the user generation module 112 may be performed by the server generation module 114. In these and other embodiments, there may be no necessary order or sequence to generation and communication of the set(s) of exchange information.

The server generation module 114 may be implemented using hardware including a processor, a microprocessor (e.g., to perform or control performance of one or more operations), an FPGA, or an ASIC. In some other instances, the server generation module 114 may be implemented using a combination of hardware and software. Implementation in software may include rapid activation and deactivation of one or more transistors or transistor elements such as may be included in hardware of a computing system (e.g., the trusted entity server 108, the system server 140, and the computing system 104). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. Specifically, the operating environment may include one or more users 106, one or more computing systems 104, one or more system servers 140, one or more trusted entity servers 108, or any combination thereof. Moreover, the separation of various components in the embodiments described herein is not meant to indicate that the separation occurs in all embodiments. It may be understood with the benefit of this disclosure that the described environment components may be integrated together in a single component or separated into multiple components. For example, in some embodiments, the user generation module 112 and/or one or more functionalities attributed thereto may be performed by a module on the system server 140.

In the operating environment 100, memory in one or more of the environment components may be similar to memory 308 described with reference to FIG. 3, processors in one or more of the environment components may be similar to a processor 304 described with reference to FIG. 3, and network communication capabilities of one or more of the environment components may be provided by a communication unit 302 described with reference to FIG. 3.

Figure 2:
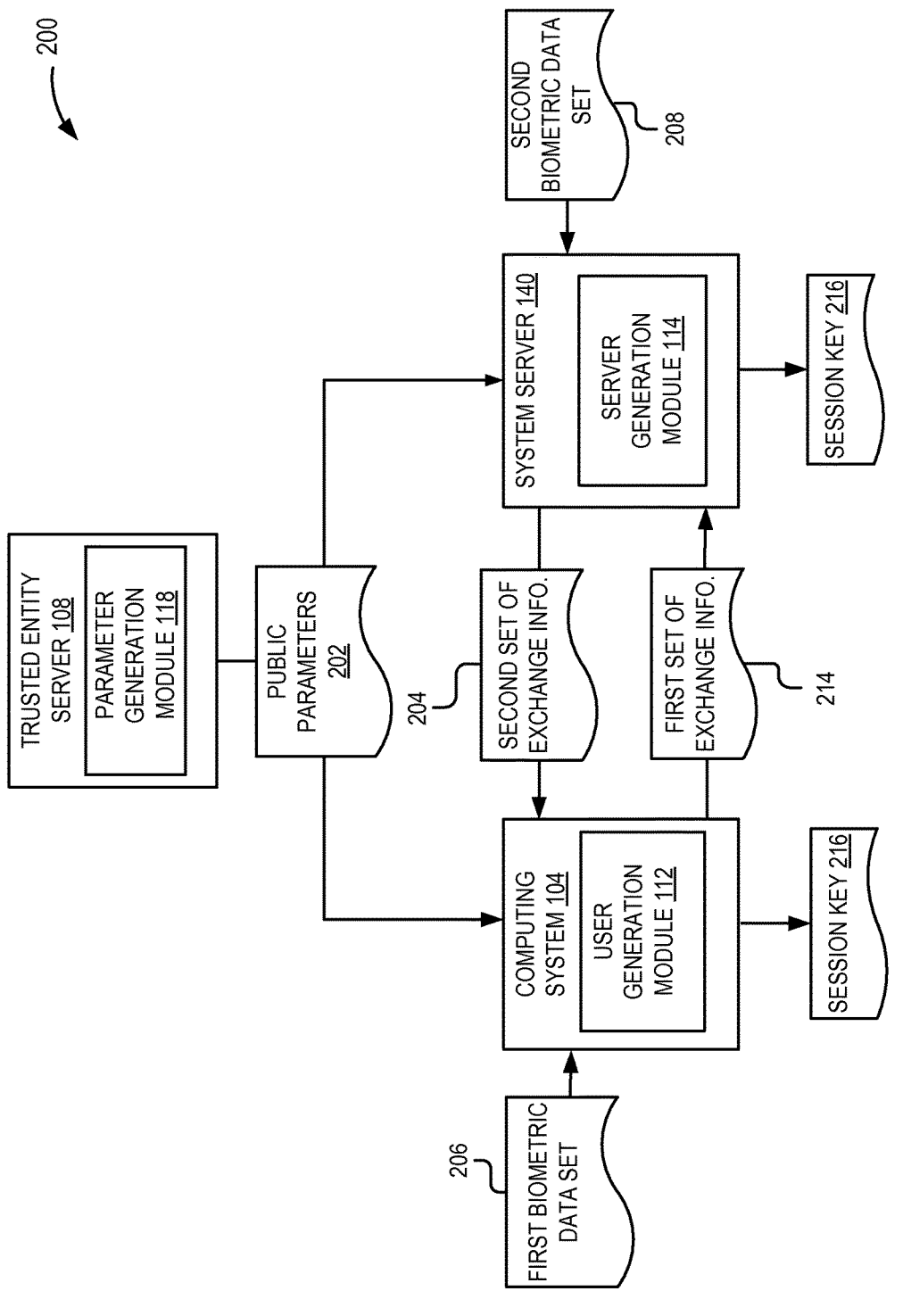
FIG. 2 illustrates an example equality verification process in the operating environment of FIG. 1.

FIG. 2 illustrates example biometric authenticated key exchange process (BAKE process) 200 that may be implemented in the operating environment 100 of FIGS. 1 and 2. In the operating environment 100 of FIG. 2, the network 107 is omitted. Nevertheless, communication of information and data (e.g., 202, 204, 206, 208, 214, and 216) between the trusted entity server 108, the computing system 104, and the system server 140 may be via the network 107.

In general, the parameter generation module 118 of the trusted entity server 108 may generate public parameters 202. The public parameters 202 may be communicated to or otherwise made available to the computing system 104 and the system server 140. The user generation module 112 of the computing system 104 may receive one or more of the public parameters 202. In addition, the user generation module 112 of the computing system 104 may receive a first biometric data set 206. The user generation module 112 may generate a first set of exchange information 214 (in FIG. 2, a first set of exchange info.). The user generation module 112 and/or the computing system 104 may communicate the first set of exchange information 214 to the system server 140. Based on the first set of exchange information 214 and one or more of the public parameters 202, the server generation module 114 may evaluate a session key 216.

Similarly, the server generation module 114 of the system server 140 may receive one or more of the public parameters 202. In addition, the server generation module 114 of the system server 140 may receive a second biometric data set 208. The server generation module 114 may generate a second set of exchange information 204 (in FIG. 2, a second set of exchange info.). The server generation module 114 may communicate the second set of exchange information 204 to the computing system 104. Based on the second set of exchange information 204 and one or more of the public parameters 202, the user generation module 112 may evaluate the session key 216.

The session key 216 may be used for further communications between the computing system 104 and the system server 140 during a communication session. For example, the session key 216 may be used in encryption and/or decryption of communications between the computing system 104 and the system server 140. In some embodiments, the session key 216 may be generated via the BAKE process 200 for one or more communication sessions between the computing system 104 and the system server 140. For example, for each communication session the session key 216 may be generated via the BAKE process 200. In the following paragraphs, some additional details of a general and a modified BAKE process 200 are provided.

The Biometric Data Sets 206 and 208 and Shared Session Identifier

To execute the BAKE process 200, the computing system 104 may hold the first biometric data set 206 and the system server 140 may hold the second biometric data set 208. As mentioned above, due to the nature of the biometric samples, there may be differences between the first biometric data set 206 and the second biometric data set 208. For the biometric data sets 206 and 208 to be considered as having originated at the same user (e.g., the user 106 of FIG. 1), the differences between the biometric data sets 206 and 208 may be less than a particular distance. For example, in some embodiments, the particular distance between the first biometric data set 206 and the second biometric data set 208 may be defined according to an example biometric distance expression:

$DIST(b, b') < \delta$.

In the biometric distance expression, DIST represents a hamming distance function. The parameter b represents the first biometric data set 206. The parameter b' represents the second biometric data set 208. The parameter $\delta$ represents the particular distance threshold.

The particular distance may be defined as a threshold value indicating sufficient similarity between the first biometric data set 206 and the second biometric data set 208 such that it may be concluded that the first biometric data set 206 and the second biometric data set 208 originate at a single user (e.g., the user 106 of FIG. 1). For example, the particular distance may indicate sufficient overlap of biometric characteristics that may be unique to the single user. In circumstances in which the distance between the first biometric data set 206 and the second biometric data set 208 are above the particular distance, an imposter may be posing as a user or the biometric sample may be unsatisfactory.

In addition, the computing system 104 and the system server 140 may include a shared session identifier. The shared session identifier may be specific to a particular communication session between the computing system 104 and the system server 140. One or more of the communication sessions may have a particular share session identifier. For example, in the embodiment depicted in FIG. 2, each of the communication sessions may have a unique or substantially unique shared session identifier.

General BAKE Process 200

In some embodiments, the public parameters 202 may include two public keys that may be generated using a first encryption scheme and a second encryption scheme. The first encryption scheme and the second encryption scheme may be adaptive chosen-ciphertext attack (CCA-2) secure. The second encryption scheme may be a labeled CCA-2 encryption scheme (e.g., a Cramer Shoup encryption scheme). The first encryption scheme may be similar to the second encryption scheme except the first encryption scheme may be unlabeled. Some details of the first encryption scheme and the second encryption scheme are provided elsewhere in this disclosure.

In addition, the public parameters 202 may include a common random string (CRS) for a simulation sound non-interactive zero-knowledge (NIZK) proof system. Some additional details of the NIZK proof system are provided in Jens Groth and Amit Sahai, *Efficient Non-Interactive Proof Systems For Bilinear Groups*. Cryptology ePrint Archive, Report 2007/155, 2007. http://eprint.iacr.org/2007/155, which is incorporated herein by reference in its entirety.

The public parameters 202 may also include a smooth projective hash function for a second public key of the two public keys and an error correcting code (ECC). The ECC may be used during execution of the BAKE process 200. For example, the ECC may be included in the BAKE process 200 to accommodate for any differences that may exist between the first biometric data set 206 and the second biometric data set 208.

In the following paragraphs, execution of the general BAKE process 200 is described. The general BAKE process 200 and the modified exchange process discussed elsewhere in this disclosure may be substantially symmetric. For example, the system server 140 and the computing system 104 may execute the BAKE process 200 symmetrically. In symmetric execution, steps taken by the computing system 104 are substantially mirrored by steps taken by the system server 140.

Generally, to execute the general BAKE process 200, the computing system 104 and the system server 140 generate the sets of exchange information 204 and 214. In the general BAKE process 200, each of the sets of exchange information 204 and 214 include (1) a projected key, (2) a ciphertext of a hash key, (3) a zero knowledge proof, (4) a ciphertext of a label and the random number, and (5) randomized biometrics of one of the biometric data sets 206 or 208.

Generation of the sets of exchange information 204 and 214 may be according to general exchange information expressions. The general exchange information expressions are described below with an example smooth projective hash function expression and an example ECC expression. The general exchange information expressions for the computing system 104 may include:

$EI1=(s, c1, \pi, c2, x)$;
$k \leftarrow K$;
$s=\alpha(k)$;
$c1=ENC1_{pk1}(k)$;
$\pi=PCRS(s, c1) \in L$;
$label=(sid, P, P', s, c1, \pi)$;
$r \leftarrow \{0,1\}^{k'}$;
$c2=ENC2_{pk2}(label, r)$;
$x=b \oplus Encode(r)$; and
$L=\{(s, c1): \exists k \in K$ and $w$ such that $s=\alpha(k)$ and $c1=ENC1_{pk1}(k; w)\}$.

The general exchange information expressions for the system server 140 may include:

$k' \leftarrow K$;
$s'=\alpha(k')$;
$c1'=ENC1_{pk1}(k')$;
$\pi'=PCRS(s', c1') \in L$;
$label'=(sid, P', P, s', c1', \pi')$;
$r' \leftarrow \{0, 1\}^{k'}$;
$c2'=ENC2_{pk2}(label', r')$;
$x'=b' \oplus Encode(r')$;
$EI2=(s', c1', \pi', c2', x')$; and
$L'=\{(s', c1'): \exists k' \in K$ and $w'$ such that $s'=\alpha(k')$ and $c1'=ENC1_{pk1}(k'; w')\}$.

The smooth projective hash function expression may include:

$(K, Gc, H=\{HASH_k\}_{k \in K}, S, \alpha: K \rightarrow S)$.

The ECC expression for the computing system 104 may include:

$(n', k', 2\delta'+1)$ $ECC=(Encode, Decode)$.

In the general exchange information expressions, b and b' are as described above. Throughout this disclosure, the prime indicator (') indicates that the parameter is generated at the system server 140 and an absence of the prime indicator (') indicates the parameter is generated at the computing system 104. The parameter P represents a device identifier for the computing system 104 and P' represents a device identifier for the system server 140. The parameter sid represents the shared session identifier. The parameter $\alpha$ represents a smooth hash function. The parameters k and k' represent hash keys. Specifically, k represents the hash key generated at the computing system 104 and k' represents the hash key generated at the system server 140 in accordance with the prime indicator convention described immediately above. The operator $\leftarrow$ represents a random-uniform drawing operator. The expressions $x=b \oplus Encode(r)$ and $x'=b' \oplus Encode(r')$ represent randomized biometric expression.

The parameters s and s' represent projected keys. The parameters c1 and c1' represent ciphertexts of the hash keys. The parameters c2 and c2' represent ciphertexts of the labels and the random numbers. The parameters $\pi$ and $\pi'$ represent zero knowledge proofs. The parameters x and x' represent randomized biometrics. The parameters w and w' represent witnesses. The operator PCRS( ) represents a simulation sound NIZK. The parameter L represents a language. The parameters label and label' represents labels for the communication session. The parameters r and r' represent random numbers. The sets $\{0, 1\}^{k'}$ and $\{0, 1\}^k$ represent binary vector spaces having a dimension of the hash key generated at the computing system from which the random numbers are sampled. The parameter pk1 represents the first public key. The function ENC1 represents an encryption operator of the first encryption scheme. The parameter pk2 represents the second public key. The function ENC2 represents an encryption operator of the second encryption scheme. The parameter EI1 represents the first set of exchange information 214 and the parameter EI2 represents the second set of exchange information 204. The operator $\exists$ represents an "at least one element exists" operator. The operator $\in$ represents a membership function.

The function (n', k', $2\delta'+1$) ECC represents the error correction code that accommodates for differences in between the biometric data sets 206 and 208 as discussed above. The notation (n', k', $2\delta'+1$) represents general coding theory notation. In the general coding theory notation, n' represents a length of the code words, k represents a number of possible code words (e.g., $2^k$), and $2\delta'+1$ represents an error tolerance. The $\delta'$ may be substantially equivalent to the $\delta$ in some circumstances. The operator Encode represents an ECC encoding operator. The operator Decode represents an ECC decoding operator.

The expression $(K, Gc, H=\{HASH_k\}_{k \in K}, S, \alpha: K \rightarrow S)$ represents a smooth projective hash function in the second public key. The operator $HASH_k$ represents a first hash function based on the hash key. The operator $\oplus$ represents an XOR operator. The parameter K represents a keyspace. The parameter Gc represents a cyclic group. The parameter H represents a hash function family. The parameter S represents an output space.

After the sets of exchange information 204 and 214 are generated, the sets of exchange information 204 are communicated between the computing system 104 and the system server 140. The user generation module 112 and the server generation module 114 may compute the session key 216 based on some subset of information in the received sets of exchange information 204 and 214, the communicated sets of exchange information 204 and 214, one or more of the public parameters 202, or some combination thereof.

In some embodiments, the computation of the session key 216 may be according to general evaluation expressions.

In the general evaluation expressions for the computing system 104, the computing may include applying a first hash function based on the hash key generated at the computing system 104 to a subset of the second set of exchange information 204 and applying a second hash function based on a projected key generated at the system server 140 to a subset of the first set of exchange information 214. For instance, for the computing system 104, the general computation expressions may include:

skp=HASH$_k$ (label', c2', x')·PROJHASH$_{\alpha(k')}$ (label, c2, x), where label'=(sid, P', P, s', c1', π') and r'=Decode (x'⊕b)= DEC2$_{pk2}$(c2').

For the system server 140, computing the session key 216 may be symmetric. Accordingly, for the system server 104, the general evaluation expressions may include:

skp=HASH$_{k'}$ (label, c2, x)·PROJHASH$_{\alpha(k)}$ (label', c2', x'), where label=(sid, P, P', s, c1, π) and r=Decode (x⊕b')= DEC2$_{pk2}$(c2).

In the evaluation expressions, label, label', c2, c2', x, x', sid, P, P', s, s', c1, c1', π, π', r, r', b, b', pk2, DEC2, ⊕, α, HASK$_k$ are as described above. The operator PROJHASH$_{\alpha(k)}$ represents the second hash function. The parameter skp represents the session key.

The entity (e.g., the computing system 104 or the system server 140) that receives the set of exchange information 204 or 214, may compute the first hash function (e.g., HASH$_k$ (label, c2, x) or HASH$_k$ (label', c2', x')) because the reception entity knows the hash key (k or k') and can recover the random number (r and r') using the Decode operator of the ECC. In addition, the reception entity can compute the second hash function (e.g., PROJHASH$_{\alpha(k)}$ (label', c2', x') or PROJHASH$_{\alpha(k)}$ (label, c2, x)) using the projected key (e.g., s, s', α(k), or α(k')) and the randomness (r or r') to generate the ciphertexts of the label and the random number (e.g., c2 or c2').

Encryption Schemes in the General BAKE Process 200

As mentioned above, the public parameters 202 may include two public keys. The public keys may be generated using a first encryption scheme and a second encryption scheme. The second encryption scheme may be initiated by a Labeled Cramer Shoup encryption scheme. The second encryption scheme may be CCA-2 secure under the decisional Diffie-Hellman (DDH) assumption. Some additional details of a Labeled Cramer Shoup encryption scheme are provided in Ronald Cramer and Victor Shoup. *Universal Hash Proofs And A Paradigm For Adaptive Chosen Ciphertext Secure Public-Key Encryption*, pages 404-412, 2005, which is incorporated herein by reference in its entirety. The first encryption scheme may be similar to the second encryption scheme, except for the first encryption scheme may include an unlabeled version of the second encryption scheme. In the following paragraphs, the second encryption scheme is described followed by the first encryption scheme.

The second encryption scheme may include a key generation operator, an encryption operator, and a decryption operator. The key generation operator may output a public key and a secret key. The public key may be used for encryption and the secret key may be used for decryption.

To generate the public key and the secret key, a cyclic group may be chosen. The cyclic group may include a large prime order and two independent generators. The cyclic group may include a collision resistant hash function onto a set of the integers of the prime order and a reversible mapping within a defined range.

For example, in some embodiments, the key generation operator of the second encryption scheme may generate the public key and the secret key according to second key generation expressions:

GEN2:
Choose: Gc (p);
(g1, g2)←Gc;
(x1, x2, y1, y2, z)←Zp;
c=g1$^{x1}$g2$^{x2}$;
d=g1$^{y1}$g2$^{y2}$;
h=g1$^z$;
pk2=(Gc, g1, g2, c, d, h, CRHASH);
sk2=(x1, x2, y1, y2, z);
CRHASH onto Zp* and Gr from $\{0, 1\}^n$ to Gc; and
Output: (pk2, sk2)

In the second key generation expressions, GEN2 represents the key generation operator of the second encryption scheme. The parameter Gc represents the cyclic group. The parameter p represents the prime order of the cyclic group. The parameter g1 represents a first independent generator of the cyclic group. The parameter g2 represents a second independent generator of the cyclic group. The parameter Zp represents the set of integers of the prime order of the cyclic group. The notation Zp further represents the set of integers modulo p with the addition operation. In contrast, the notation Zp* represents the set of integers module p with the multiplication operation. The parameters x1, x2, y1, y2 and z represent samples of the set of integers of the prime order. The parameters c, d, and h represent intermediate generator parameters. The function CRHASH represents the collision resistant hash function. The parameter Gr represents the reversible mapping. The parameter $\{0, 1\}^n$ to Gc represents the range. The parameter pk2 represents the public key, which may be the second public key implemented in the BAKE process 200. The parameter sk2 represents the secret key of the second encryption scheme.

The encryption operator of the second encryption scheme may receive an input and generate a ciphertext of the input. For example, the input may include a label, a message, and a random number. The ciphertext generated by the encryption operator may include a reversed message, a hashed value, and one or more parameters of the public key.

In some embodiments, the encryption operator may generate the ciphertext according to second encryption expressions:

ENC2$_{pk2}$:
Input=(label, m, r);
m∈$\{0, 1\}^n$;
r∈Zp;
M=Gr(m);
ε=CRHASH (label, g1$^r$, g2$^r$, Mh$^r$);
CX=(label, g1$^r$, g2$^r$, Mh$^r$, (cd$^ε$)$^r$); and
output CX.

In the second encryption expressions pk2, Zp, Gr, CRHASH, g1, g2, c, d, and $\{0, 1\}^n$ are as described above. The parameter ENC2$_{pk2}$ represents the encryption operator of the second encryption scheme. The encryption operator is based on the second public key. The parameter label is the label that is included in input. The parameter m represents the message. The parameter r represents the random number. The parameter M represents the reversed message. The parameter c represents the hashed value. The parameter CX represents the ciphertext that is output by the encryption operator.

The decryption operator of the second encryption scheme may receive an input and generate a message that is encrypted in the input. The decryption operator may generate the message based on the second public key and the secret key generated by the key generation operator of the second encryption scheme.

For example, the input may include a label and a ciphertext. The decryption operator may determine whether a hash value of the label and a portion of the ciphertext is equal to another portion of the ciphertext. Based on whether the hash value is equal, the decryption operator may output the message.

In some embodiments, the decryption operator may generate the message according to second decryption expressions:

$DEC2_{(pk2, sk2)}$:
Input=(label, CY), where CY=(u1, u2, e, v);
if $\varepsilon$=CRHASH (label, u1, u2, e), if $(u1^{x1}u2^{x2}(u1^{y1} u2^{y1})^{\varepsilon} \stackrel{?}{\neq} v$,
    output $\perp$
otherwise:
    output $m=Gr^{-1}(e/u1^{z})$.

In the second decryption expressions, CRHASH, label, pk2, sk2, m, $\varepsilon$, x1, x2, y1, y2, z, and Gr are as described above. The operator $DEC2_{(pk2,sk2)}$ represents the decryption operator for the second encryption scheme. The parameter CY represents the ciphertext for the decryption operator of the second encryption scheme. The parameters u1, u2, e, v represent elements of ciphertext. The operator $\perp$ represents a contradictory operator.

As stated above, the first encryption scheme may be similar to the second encryption scheme, except the first encryption scheme may be an unlabeled version of the second encryption scheme. For example, the first encryption scheme may be defined according to first key generation expressions, first encryption expressions, and first decryption expressions:

GEN1:
Choose Gc (p);
(g1,g2)←Gc;
(x1, x2, y1, y2, z)←Zp;
$c=g1^{x1}g2^{x2}$;
$d=g1^{y1}g2^{y2}$;
$h=g1^{z}$;
pk1=(Gc, g1, g2, c, d, h, CRHASH);
sk1=(x1, x2, y1, y2, z);
CRHASH onto Zp* and Gr from $\{0, 1\}^n$ to Gc; and
    output: (pk1, sk1)
$ENC1_{pk1}$:
Input=(m, r);
$m \in \{0, 1\}^n$;
r∈Zp;
M=Gr(m);
$\varepsilon$=CRHASH $(g1^r, g2^r, Mh^r)$;
$CX=(g1^r, g2^r, Mh^r, (cd^{\varepsilon})^r)$; and
    output CX.
$DEC1_{(pk1,sk1)}$:
Input=(CY),
where CY=(u1, u2, e, v);
if $\varepsilon$=CRHASH (u1, u2, e), if $(u1^{x1}u2^{x2}(u1^{y1} u2^{y1})^{\varepsilon} \stackrel{?}{\neq} v$,
    output $\perp$; and
otherwise:
    output $m=Gr^{-1}(e/u1^{z})$.

In the first key generation expressions, the first encryption expressions, and the first decryption expressions, the majority of the parameters are similar to those described above with reference to the second encryption scheme. The parameters pk1 and sk1 represent a first public key and a first secret key, respectively, that are output by the first encryption scheme. The parameter $DEC1_{(pk1,sk1)}$ represents a decryption operator for the first encryption scheme, the parameter $ENC1_{pk1}$ represents an encryption operator for the first encryption scheme, and GENT represents a first key generations operator.

In some embodiments, the first public key output by the first encryption scheme, the second public output by the second encryption scheme, the first encryption operator, the second encryption operator, or some combination thereof may be implemented in the general exchange information expressions described elsewhere herein.

Hash-Related Expressions for General BAKE Process 200

In some embodiments, the general exchange information expressions may incorporate one or more hash-related expressions. In some embodiments, the general exchange information expressions may include a smooth projective hash function. For example, the computing system 104 and the system server 140 may use a language while sampling smooth projective hash function keys. The language may depend on the second public key. In some embodiments, the language for the computing system 104 may be defined according to a language expression:
Lb={(label, c2, x)|∃r, w such that:
    $c2=ENC2_{pk2}$ (label, r; w) and
    $r=Decode(x \oplus b)$}.

In some embodiments, the language for the system server 140 may be defined according to a language expression:
Lb'={(label', c2', x')|∃r', w' such that:
    $c2'=ENC2_{pk2}$ (label', r'; w') and
    $r'=Decode(x' \oplus b')$}

In the smooth projective hash expressions, label, label', c2, c2', x, x', ∃, r, r', $ENC2_{pk2}$, w, w', Decode, b, b', and $\oplus$ are as described above. The parameters Lb and Lb' represent the languages.

In addition, in some embodiments, the general exchange information expressions may incorporate a hash key generation for the second public key. The hash key generation may be according to hash key generation expressions:
pk2=(Gc, g1, g2, c, d, h, CRHASH);
$\eta1, \eta2, \theta, \mu, \nu \leftarrow Zp$;
Output: k=($\eta1, \eta2, \theta, \mu, \nu$); and
Output: $\alpha(k)=(k1, k2)=(g1^{\eta1}g2^{\theta}h^{\mu}c^{\nu}, g^{\eta2}d^{\nu})$.

In the hash key generation expressions, pk2, Gc, g1, g2, c, d, h, CRHASH, Zp, k, and $\alpha(k)$ are as described above. The parameters $\eta1, \eta2, \theta, \mu, \nu$ are sampled from the set of integers. The parameters k1 and k2 are elements of the projected key.

In some embodiments, the general computing expressions may incorporate a first hash function based on the hash key. The first hash function based on the hash key may be according to general first hash function expressions:
First Hash Function based on the hash key "k":
$HASH_k$ (label, c2, x) where:
    $r=Decode (x \oplus b)$, $c2=Enc2_{pk2}$ (label, r)=(u1, u2, e, v) and
    pk2=(G, g1, g2, c, d, h, CRHASH),
do the following:
    $r=Decode(x \oplus b)$;
    $\varepsilon$=CRHASH (label, u1, u2, e); and
    $HASK_k$ (label, c2, x)=$u1^{(\eta1+\varepsilon\eta2)}u2^{\theta}(e/Gr)^{\mu}v^{\nu}$.

In some embodiments, the general computing expressions may incorporate a second hash function based on the projected key. The second hash function based on the projected key may be according to general second hash function expressions:

Second Hash Function based on the Projected Key (k1, k2):

PROJHASK$_{\alpha(k)}$(label, c2, x) where:
r=Decode(x⊕b), c2=Enc2$_{pk2}$ (label, r; w)=(u1, u2, e, v) and
pk2=(G, g1, g2, c, d, h, CRHASH),
do the following:
ε=CRHASH (label, u1, u2, e); and
PROJHASK$_{\alpha(k)}$(label, c2, x)=(k1k2$^\varepsilon$)$^w$ In the general first and second hash function expressions, the parameters are as described above.

Trapdoor Smooth-Projective Hash Function Construction

In some embodiments, a trapdoor smooth-projective hash function (TSPHF) construction may be implemented to increase efficiency of execution of the general BAKE process 200 discussed elsewhere herein. An overview of the TSPHF construction is provided below. Some additional details of the TSPHF construction are provided in Benhamouda et al. *New Techniques For Sphfs And Efficient One-Round PAKE Protocols*. pages 449-475, 2013, which is incorporated herein by reference in its entirety. When the general BAKE process 200 is implemented with the TSPHF construction, the BAKE process 200 is referred to as a modified BAKE process 200. The general steps of the modified BAKE process 200 may be similar to the general BAKE process 200.

The TSPHF construction includes a language definition for the TSPHF, a hash key generation for a public key and a second common random string (CRS'), a validity check of a projection key with the public key and the second common random string, applying a first hash function based on the hash key, applying a second hash function based on the projection key, and a hash evaluation with the hash key and a trapdoor. Each of these is discussed in the following paragraphs. The TSPHF construction may be performed by the parameter generation module 118, the user generation module 112, the server generation module 114, or some combination thereof.

In the TSPHF construction, before a modified public key is given, a TSPHF language may be defined for the TSPHF. In some embodiments, the TSPHF language may be defined according to TSPHF language expressions:

LbT={(label, cT, x)|∃w, r such that:
cT=ENCT$_{pkm}$ (label, r; w) and
r=Decode(x⊕b)}.

In the TSPHF language expressions, label, x, w, r, ∃, Decode, ⊕, and b are as described above. The parameter LbT represents the TSPHF language. The parameter cT represents a ciphertext used in the TSPHF language expressions. The function ENCT$_{pkm}$ represents an encryption operator of a TSPHF encryption scheme. The parameter pkm represents the modified public key. The operator | represents a "such that" operator.

In the TSPHF construction, bilinear groups may be generated. The bilinear groups may be generated of a prime order and may include a pairing operator. In some embodiments, the bilinear groups may be represented by a bilinear group expression (p, G1, G2, GT, ê). In the bilinear group expression, p represents the prime order, G1 represents a first bilinear group, G2 represents a second bilinear group, GT represents an output bilinear group, and ê represents a pairing operator.

Additionally, in the TSPHF construction, a TSPHF key generation scheme may be implemented. The TSPHF key generation scheme may be a labeled Cramer Shoup encryption scheme that works in a first bilinear group of the generated bilinear groups. The TSPHF key generation scheme may be represented by TSPHF key generation expressions:

(GENt, ENCt, DECt)
GENt
outputs (pkm, skm);
pkm=(G1, g1-1, g1-2, c, d, h-1, CRHASH);
skt=(x1, x2, y1, y2, z); and
g2←G2.

In the key generation expressions, x1, x2, y1, y2, z, G2, G1, c, CRHASH, d, pkm, and CRHASH are as described above. The parameters g1-1 and g1-2 represent generators of the first bilinear group of the bilinear groups. The operator GENt represents a TSPHF key generation operator. The parameter h-1 represents a group element of the second bilinear group. The operator ENCt represents a TSPHF encryption operator. The operator DECt represents a TSPHF decryption operator. The parameter skm represents a modified secret key. The parameter g2 represents a generator of the second bilinear group.

Additionally, in the TSPHF construction, a TSPHF random number, which may constitute a trapdoor, may be chosen and the CRS' may be set to the generator sampled from the second bilinear group raised to the power of the trapdoor. For example, the trapdoor and the CRS' may be according to TSPHF setup expressions:

τ'←Zp;
CRS' set to ζ; and
ζ=g2$^{\tau'}$.

In the setup expression, g2 is as described above. The parameter τ' represents the trapdoor. The parameter ζ is set to the CRS'. The parameter Zp represents a set of integers of the prime order of the bilinear groups.

In addition, in the TSPHF construction, a hash key generation for the modified public key may be implemented. In some embodiments, the hash key generation may be performed according to modified hash key generation expressions:

pkm=(G1, g1-1, g1-2, c, d, h-1, CRHASH);
CRS'=ζ;
η1, η2, θ, μ, ν←Zp;
Output: k=(η1, η2, θ, μ, ν).
Output: α(k)=(k1, k2, k3)=(g1-1$^{η1}$g1-2$^θ$h-1$^μ$c$^ν$, g1-1$^{η2}$d$^ν$, k3)ϵG1$^2$×G2$^5$;
k3=(χ1-1, χ1-2, χ2, χ3, χ4)ϵG2$^5$;
χ1-1=ζ$^{η1}$;
χ1-2=ζ$^{η2}$;
χ2=ζ$^θ$;
χ3=ζ$^μ$; and
χ4=ζ$^ν$.

In the modified hash key generation expressions, G1, G2, k1, k2, η1, η2, θ, μ, ν, CRS', g1-1, g1-2, c, d, h, CRHASH, ζ, α(k), Zp, pkm, and ϵ are as described above. The parameter k3 represents a third element of the projected key. The parameters χ1-1, χ1-2, χ2, χ3, and χ4 represent a first element, second element, third element, fourth element, and a fifth element respectively of the third element of the projected key.

In the TSPHF construction, a validity check of a projected key with the modified public key and the CRS' may be implemented. In some embodiments, the validity check of the projected key may be performed according to modified validity check expressions. For example, using the modified key and CRS" the validity of the projection key can be tested as follows.

$\hat{e}(k1, \zeta) \stackrel{?}{=} \hat{e}(g1\text{-}1, \chi1\text{-}1)\cdot\hat{e}(g1\text{-}2, \chi2)\cdot\hat{e}(h1, \chi3)\cdot\hat{e}(c, \chi4)$; and
$\hat{e}(k2, \zeta) \stackrel{?}{=} \hat{e}(g1\text{-}1, \chi1\text{-}2)\cdot\hat{e}(d, \chi4)$.

In the modified validity check expressions the parameters are as described above. In the embodiment of FIG. 2, when the modified validity check expressions are true, the projected key is valid.

In the TSPHF construction, a first hash function based on the hash key may be implemented. In some embodiments, the first hash function based on the hash key may be performed according to modified first hash function expressions:

On input (label, c, x) where
r=Decode(x⊕b), c=$ENC_{pkm}$ (label, r)=(u1, u2, e, v),
output:
$HASH_k$ (label, c, x)=$\hat{e}(u1^{(\eta1+\epsilon\eta2)}u2^\theta(e/Gr(r))^\mu v^\nu, g2)$; and
ε=CRHASH(label, u1, u2, e).

In the modified hash evaluation expressions the parameters are as described above.

In the TSPHF construction, a projected hash evaluation with a projected key may be implemented. In some embodiments, the projected hash evaluation may be performed according to modified projected hash evaluation expressions:

for α(k)=(k1, k2, k3):
On input (label, c, x; w) where
r=Decode (x⊕b), c=$ENCT_{pkm}$(label, r; w)=(u1, u2, e, v),
output:
$PROJHASH_{k1, k2, k3}$(label, c, x; w)=$\hat{e}((k1k2^\epsilon)^w, g2)$; and
ε=CRHASH(label, u1, u2, e).

In the modified projected hash evaluation expressions the majority of the parameters are as described above. The function $PROJHASH_{k1, k2, k3}$ represents a second hash function based on the projected key.

In the TSPHF construction, a hash evaluation with a hash key and trapdoor may be implemented. In some embodiments, the hash evaluation with the hash key and the trapdoor may be performed according to modified trapdoor hash evaluation expressions:

For trapdoor τ':
On input (label, c, x) where
r=Decode(x⊕b),
c=$ENCT_{pkm}$(label, r)=(u1, u2, e, v),
output
$THASH_{k,\tau'}$(label, c, x)=$(\hat{e}(u1, \chi1\text{-}1\chi1\text{-}2^\epsilon)\cdot\hat{e}(u2, \chi2)\cdot\hat{e}(e/Gr(mT), \chi3)\cdot\hat{e}(v, \chi4))^{1/\tau'}$;
and
ε=CRHASH (label, u1, u2, e).

In the modified trapdoor hash evaluation expressions the majority of the parameters are as described above. The parameter mT denotes a group property in the expressions.

Modified BAKE Process 200

The modified BAKE process 200 may involve use of one or more portions of the TSPHF construction discussed elsewhere in this disclosure. The modified BAKE process 200 may involve a setup phase and an execution phase. The setup phase may be performed by the parameter generation module 118, the user generation module 112, the server generation module 114, or some combination thereof.

In the set up phase, bilinear groups may be generated. The bilinear groups may be represented by a bilinear group expression (p, G1, G2, GT, ê), which is described above. Additionally, in the setup phase, the TSPHF key generation scheme may be implemented, which is also described above.

The TSPHF key generation scheme may output the modified public key and the modified secret key according to the modified key generation expressions.

Additionally, in the setup phase, a TSPHF random number may be chosen, a CRS' may be set to the generator sampled from the second bilinear group raised to the power of the trapdoor, and an ECC may be specified. A reversible mapping of the Cramer Shoup encryption scheme may be configured to map to the first bilinear group. In some embodiments, the TSPHF random number, the CRS', and the ECC may be generated according to modified setup expressions:

τ'←Zp;
(n', k', 2δ+1) ECC (Encode, Decode);
Gr:$\{0, 1\}^{k'}$←G1;
CRS' set to ζ; and
ζ=$g2^{\tau'}$.

In the modified setup expressions, the parameters are as described above.

An output of the setup phase may include a CRS. The CRS may include the modified public key and the second CRS. For example, the CRS may be represented by a CRS expression:

CRS=(pkm, ζ).

In the CRS expression the parameters are as described above.

In the execution phase of the modified BAKE process 200, the user generation module 112 and the server generation module 114 may each perform symmetric protocols that may result in the session key 216. The user generation module 112 may generate a hash key and a projected key using the modified hash key generation expressions.

In the modified BAKE process 200, the computing system 104 and the system server 140 generate the sets of exchange information 204 and 214. Each of the sets of exchange information 214 and 204 include (1) a projected key, (2) a modified ciphertext, and (3) randomized biometrics of one of the biometric data sets 206 or 208.

For example, the user generation module 112 samples a modified protocol random number. The user generation module 112 may set a randomized biometric using the Encode function of the ECC and the first biometric data set 206. The user generation module 112 may evaluate the modified ciphertext. The modified ciphertext may be based on the TSPHF encryption operator, the modified public key, a label, and the modified protocol random number.

For example, for the computing system 104 the first set of exchange information 214 may be generated according to modified exchange information expressions:

k∈$Zp^5$;
α(k)∈$G1^2\times G2^5$;
r←$\{0,1\}^{k'}$;
x=b⊕Encode (r);
C=$ENCT_{pkm}$ (label, r)∈$G1^4$;
label=(P, P', α(k), x); and
EI1=(α(k), C, x).

In the modified exchange information expressions for the computing system 104, k represents the hash key. The parameter $Zp^5$ represents a set of integers of the prime order of the bilinear groups. The value five (5) represents a number of samples drawn from the set of integers. For example, as discussed above in the Trapdoor section, the hash key (k) may include five elements (η1, η2, θ, μ, ν). The parameter α(k) represents the projected key. The parameters $G1^2$ and $G2^5$ represent the first and the second bilinear groups. The operator × represents the product operator. The parameter r represents the modified protocol random number. The operator ← represents a sampling operator. The set $\{0,1\}^{k'}$ represents a vector space of the order of the hash key. The parameter x represents the randomized biometric. The parameter b represents the first biometric data set 206. The operator ⊕ represents an XOR operator. The parameter C represents the modified ciphertext. The operator $ENCT_{pkm}$ represents the encryption operator of the modified BAKE process 200. The parameter label represents the label. The parameter P and P' represent the identifiers for the computing system 104 and the system server 140, respectively. The parameter EI1 represents the first set of exchange information 214. The first set of exchange information 214 may be communicated to the system server 140.

As mentioned above, the modified BAKE process 200 may be symmetric. Accordingly, the system server 140 may generate the second set of exchange information 204, which may be communicated to the computing system 104. Similar to the first set of exchange information 214, the second set of exchange information 204 may include a projected key, a modified ciphertext, and a randomized biometric using an Encode function of the ECC and the second biometric data set 208. In some embodiments, the second set of exchange information 204 may be generated according to modified exchange information expressions:

k'∈$Zp^5$;
α(k')∈$G1^2 \times G2^5$;
r'←$\{0,1\}^k$;
x'=b'⊕Encode (r');
C'=$ENCT_{pkm}$ (label', r')∈$G1^4$;
label'=(P', P, α(k'), x'); and
EI2=(α(k'), C', x').

In the modified exchange information expressions for the system server 140, the parameters represent values similar to those described above with reference to the computing system 104. The system server 140 may communicate the second set of exchange information (EI2) 204 to the computing system 104.

The computing system 104 may receive the second set of exchange information 204 from the system server 140. Upon receiving the second set of exchange information 204, the user generation module 112 may check the validity of the projected key using the modified public key and the CRS'. For example, the user generation module 112 may check validation of the projected key using the modified validity check expressions described elsewhere in this disclosure. If the validity check fails, then the user generation module 112 may abort execution of the modified BAKE process 200.

If the validity check is successful, the user generation module 112 may set a value of a second label and compute the session key. The second label may include a computing system identifier, a system server identifier, the projected key, and a randomized biometric of the second biometric data set 208.

The session key 216 may be computed based on the first hash function based on the hash key applied to the second label, the modified ciphertext communicated from the system server 140, and the randomized biometric of the second biometric data set 208 and on a second hash function based on a projected key applied to the label generated at the computing system 104, the modified ciphertext generated at the computing system 104, the randomized biometric of the first biometric data set 206, and the witness. The user generation module 112 may be able to compute the session key 216 because it is able to recover a received random number using the Decode operator of the ECC as long as differences between the first biometric data set 206 and the second biometric data set 208 are below a particular threshold.

In some embodiments, the session key 216 may be computed for the computing system 104 according to modified computation expressions:

skp=$HASH_k$(label', C', x')·$PROJHASH_{\alpha(k')}$(label, C, x; w); and
r' is recoverable using Decode (b⊕x'), if DIST (b, b')<δ.
In the modified computation expression for the computing system 104, r', DIST, δ, Decode, b, b', ⊕, label, label', C', C, x, x', w, k, and k' are as described above. The parameter skp represents the session key 216. The function $HASH_k$ represents the first hash function. The function $PROJHASH_{\alpha(k')}$ represents the second hash function.

The system server 140 may perform a symmetric operation. For example, the session key 216 may be computed for the system server 140 according to modified computation expressions:

skp=$HASH_k$(label, C, x)·$PROJHASH_{\alpha(k)}$(label', C', x'; w'); and
is recoverable using Decode (b'⊕x), if DIST (b, b')<δ.
In the session key expression for the system server 140, the parameters are as described above.

Using the efficient execution of the BAKE process 200, under the symmetric external Diffie-Hellman (SXDH) assumption for an asymmetric bilinear group and assuming that the distribution of syndromes of noisy biometrics is independent of the individual, the above processes 200 realize an ideal functionality. In some embodiments, the ideal functionality may be substantially equivalent to an ideal game in which an adversary's power is limited. For example, ideal functionality may be defined according to ideal functionality queries:

Functionality FBAKE: The functionality $_{FBAKE}$ is parameterized by a security parameter k. It interacts with an adversary S and a set parties via the following queries:

Upon receiving a query (NEwSESSION, sid, Pi, Pj, b, role) from party Pi: Send (NEwSESSION, sid, Pi, Pj, role) to S. In addition, if this is the first NEwSESSION query, or if this is the second NEwSESSION query and there is a record (Pj, Pi, b'), then record (Pi, Pj,b) and mark this record FRESH.

Upon receiving a query (TESTBIO, sid, Pi, b') from the adversary S: If there is a record of the form (Pi, Pj, b) which is FRESH, then do: If DIST(b, b')<δ, then mark the record COMPROMISED and reply to S with "correct guess". Otherwise, mark the record INTERRUPTED and reply with "wrong guess".

Upon receiving a query (NEwKEY, sid, Pi, sk) from S, where |sk|=k: If there is record of the form (Pi, Pj, b), and this the first NEwKEYquery for Pi, then:
If this record is COMPROMISED, or either Pi or Pj is corrupted, then output (sid, sk) to player Pi.
If this record is FRESH, and there is a record (Pj, Pi, b') with DIST(b, b')<δ and a key sk' was sent to Pj, and (Pj, Pi, b') was FRESH at the time, then output (sid, sk') to Pi.
In any other case, pick a new random key sk' of length k and send (sid, sk') to Pi In all cases mark the record (Pi, Pj, b) as COMPLETED.

In the ideal functionality queries, k represents a security parameter by which the functionality is parameterized. $F_{BAKE}$ represents the functionality that interacts with an adversary represented by S. The parameters sid represents a session identifier. The parameters $P_i$ and $P_j$ represent parties.

The parameters b and b' represents biometric data sets. the parameter sk and sk' represent session keys. DIST and δ are as defined above.

The ideal functionality is similar to the UC security proof. Some details of the ideal functionality are described with reference to Ran Canetti. *Universally Composable Security: A New Paradigm for Cryptographic Protocols*. pages 136-145, 2001, which is incorporated herein by reference in its entirety.

Figure 3:
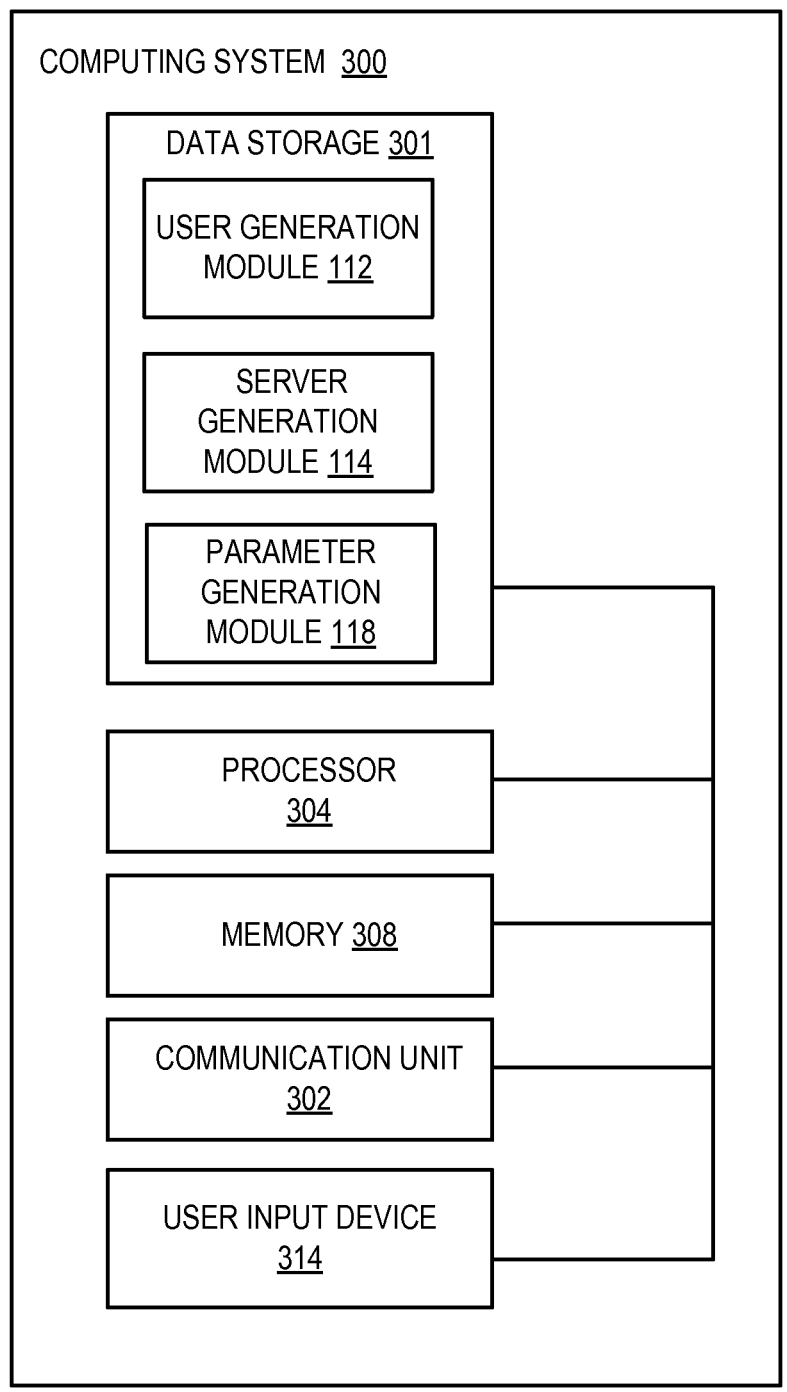
FIG. 3 illustrates an example computing system configured for equality verification using relational encryption.

FIG. 3 illustrates an example computing system 300 configured for one or more authenticated key exchange processes. The computing system 300 may be implemented in the operating environment 100 of FIGS. 1 and 2. Examples of the computing system 300 may include one or more of the computing system 104, the system server 140, and the trusted entity server 108. The computing system 300 may include one or more processors 304, a memory 308, a communication unit 302, a user input device 314, and a data storage 301 that further includes the user generation module 112, the server generation module 114, and the parameter generation module 118 (collectively, modules 112/114/118).

The processor 304 may include any suitable special-purpose or general-purpose computer, computing entity, or processing device including various computer hardware or software modules and may be configured to execute instructions stored on any applicable computer-readable storage media. For example, the processor 304 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 3, the processor 304 may more generally include any number of processors configured to perform individually or collectively any number of operations described in the present disclosure. Additionally, one or more of the processors 304 may be present on one or more different electronic devices or computing systems. In some embodiments, the processor 304 may interpret and/or execute program instructions and/or process data stored in the memory 308, the data storage 301, or the memory 308 and the data storage 301. In some embodiments, the processor 304 may fetch program instructions from the data storage 301 and load the program instructions in the memory 308. After the program instructions are loaded into the memory 308, the processor 304 may execute the program instructions.

The memory 308 and the data storage 301 may include computer-readable storage media for carrying or having computer-executable instructions or data structures stored thereon. Such computer-readable storage media may include any available media that may be accessed by a general-purpose or special-purpose computer, such as the processor 304. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 304 to perform a certain operation or group of operations.

The communication unit 302 may include one or more pieces of hardware configured to receive and send communications. In some embodiments, the communication unit 302 may include one or more of an antenna, a wired port, and modulation/demodulation hardware, among other communication hardware devices. In particular, the communication unit 302 may be configured to receive a communication from outside the computing system 300 and to present the communication to the processor 304 or to send a communication from the processor 304 to another device or network.

The user input device 314 may include one or more pieces of hardware configured to receive input from and/or provide output to a user. In some embodiments, the user input device 314 may include one or more of a speaker, a microphone, a display, a keyboard, and a touch screen, a holographic projection, among other hardware devices. In these and other embodiments, the user input device 314 may be configured to receive input from a user (e.g., the user 106 of FIG. 1) of the computing system 300.

The modules 112/114/118 may include program instructions stored in the data storage 301. The processor 304 may be configured to load the modules 112/114/118 into the memory 308 and execute the modules 112/114/118. Alternatively, the processor 304 may execute the modules 112/114/118 line-by-line from the data storage 301 without loading them into the memory 308. When executing the modules 112/114/118, the processor 304 may be configured for performance of an authenticated key exchange as described elsewhere herein.

Modifications, additions, or omissions may be made to the computing system 300 without departing from the scope of the present disclosure. For example, in some embodiments, the computing system 300 may not include the user input device 314. In some embodiments, the different components of the computing system 300 may be physically separate and may be communicatively coupled via any suitable mechanism. For example, the data storage 301 may be part of a storage device that is separate from a server, which includes the processor 304, the memory 308, and the communication unit 302, that is communicatively coupled to the storage device.

Figure 4:
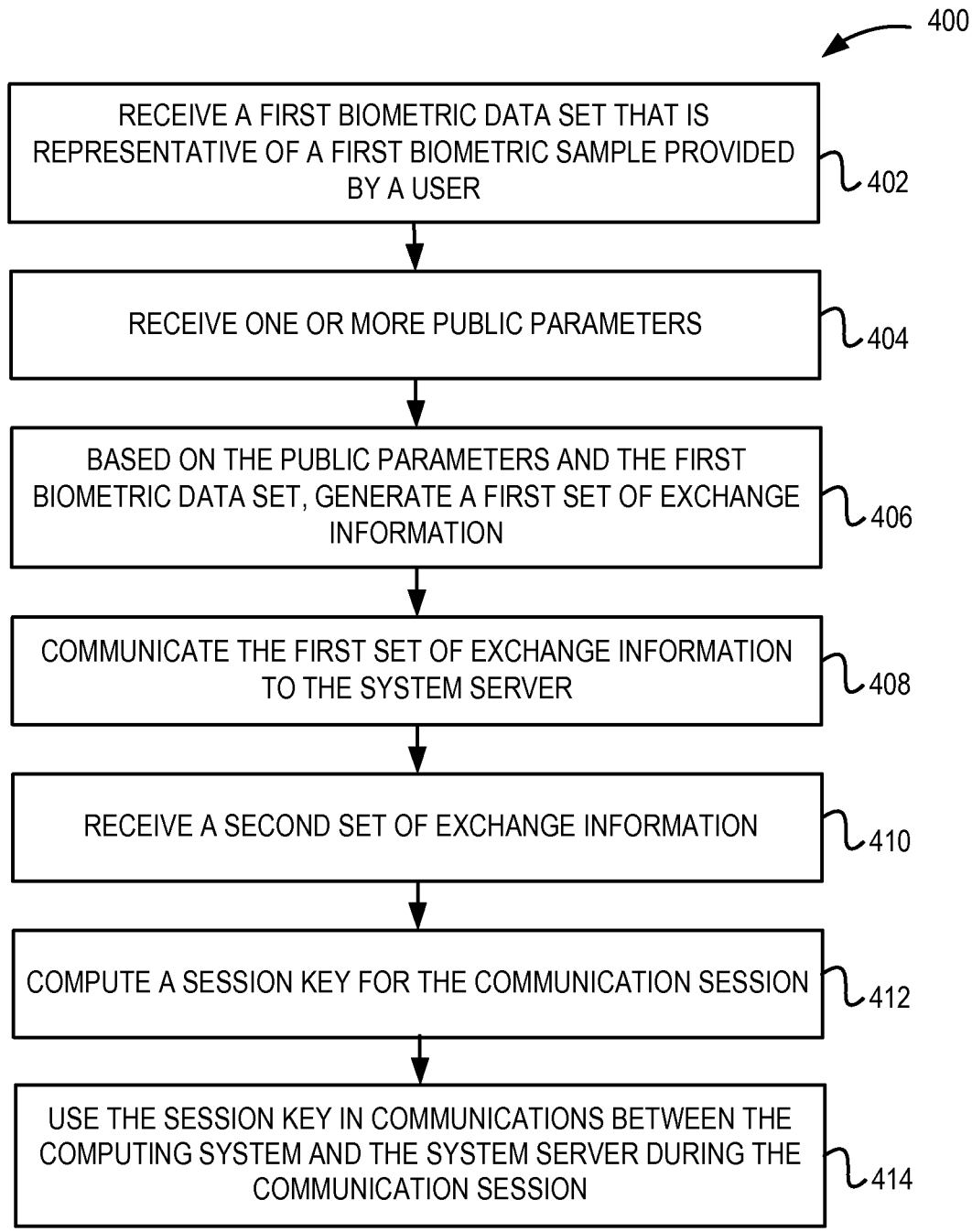
FIG. 4 is a flow diagram of an example method of biometric authenticated key exchange, all arranged in accordance with at least one embodiment described herein.

FIG. 4 is a flow diagram 400 of an example method of biometric authenticated key exchange for a communication session between a computing system and a system server, arranged in accordance with at least one embodiment described herein. The method 400 may be performed in an operating environment such as the operating environment 100 of FIGS. 1 and 2. The method 400 may be programmably performed in some embodiments by the computing system 104 and/or system server 140 described with reference to FIGS. 1 and 2. The computing system 104 and/or system server 140 may include or may be communicatively coupled to a non-transitory computer-readable medium (e.g., the memory 308 of FIG. 3) having stored thereon or encoded therein programming code or instructions that are executable by a processor to perform or cause performance of the method 400. Additionally or alternatively, the computing system 104 and/or system server 140 may include a processor (e.g., the processor 304 of FIG. 3) that is configured to execute computer instructions to cause or control performance of the method 400. Although illustrated as discrete blocks, various blocks may be divided into additional blocks, combined into fewer blocks, or eliminated, depending on the desired implementation.

The method 400 may begin at block 402 in which a first biometric data set may be received. The first biometric data set may be representative of a first biometric sample provided by a user. For example, the first biometric sample may be provide to a sensor such as the sensor 148 discussed with reference to FIG. 1.

At block 404, one or more public parameters may be received from a trusted third party server. The public parameters may include an error correcting code (ECC). The ECC may be defined to accommodate for a difference or a distance between the first biometric data set and a second biometric data set received by the system server. In some embodiments, the ECC may be defined according to the ECC expression as described elsewhere in this disclosure.

Additionally or alternatively, the public parameters may be generated according to a bilinear group. The bilinear group may be represented by a bilinear group expression as described elsewhere in this disclosure. Additionally, in some embodiments, the particular distance between the first biometric data set and the second biometric data set may be defined according to a biometric distance expression as described elsewhere in this disclosure.

At block 406, a first set of exchange information may be generated based on one or more of the public parameters and the first biometric data set. At block 408, the first set of exchange information may be communicated to the system server. At block 410, a second set of exchange information may be received from the system server. In some embodiments, the second set of exchange information may be based on one or more of the public parameters and the second biometric data set that is representative of a second biometric sample provided by the user. The second set of exchange information may be symmetric with respect to the first set of exchange information.

In some embodiments, the first set of exchange information and the second set of exchange information are generated according to modified exchange information expressions as described elsewhere herein. For example, the first set of exchange information may include a projected key that is generated at the computing system, a modified ciphertext that is based on a modified public key and generated at the computing system, a randomized biometric of the first biometric data set, or some combination thereof.

Additionally, the second set of exchange information may include a projected key that is generated at the system server, a modified ciphertext that is based on the modified public key and/or generated at the system server, a randomized biometric of the second biometric data set, or some combination thereof. In these and other embodiments, the randomized biometric of the second biometric data set may be defined according to a second randomized biometric expression as described elsewhere herein. Moreover, in these and other embodiments, the modified public key may be generated according to TSPHF key generation expressions as described elsewhere in this disclosure.

In some embodiments, the first set of exchange information and the second set of exchange information are generated according to general exchange information expressions as described elsewhere in this disclosure. For example, the first set of exchange information may include a projected key generated at the computing system, a ciphertext of a hash key that is based on a first public key and/or generated at the computing system, a zero knowledge proof generated at the computing system, a ciphertext of a label and a random number that is based on a second public key and generated at the computing system, the randomized biometrics of the first biometric data set, or some combination thereof. Additionally, the second set of exchange information may include a projected key that is generated at the system server, a ciphertext of a hash key that is based on the first public key and/or generated at the system server, a zero knowledge proof generated at the system server, a ciphertext of a label and a random number that is based on the second public key and/or generated at the system server, the randomized biometrics of the second biometric data set. In these and other embodiments, the randomized biometric of the second biometric data set may be defined according to a second randomized biometric expression as described elsewhere herein. Moreover, in these and other embodiments, the first public key may include a public key output by an unlabeled Cramer Shoup encryption scheme and/or the second public key may include a public key output by labeled Cramer Shoup encryption scheme.

At block 412, a session key may be computed for the communication session. In some embodiments, the computing includes applying a first hash function based on a hash key generated at the computing system to a subset of the second set of exchange information and applying a second hash function based on a projected key generated at the system server to a subset of the first set of exchange information.

In some embodiments, the computing is according to modified first hash function expressions, modified second hash function expressions, and modified computation expressions as described elsewhere in this disclosure. In these and other embodiments, the hash key and the projected key may be generated according to modified hash key generation expressions. In some embodiments, the computing is according to general computation expressions, general first hash function expressions, and general second hash function expressions as described elsewhere in this disclosure. In these and other embodiments, the hash key and the projected key are generated according to hash key generation expressions as described elsewhere in this disclosure.

At block 414, the session key may be used in communications between the computing system and the system server during the communication session. In some embodiments, for other communication sessions one or more of blocks 402, 404, 406, 408, 410, 412, and 414 may be repeated to generate additional session keys.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, in some embodiments the method 400 may include checking the validity of the projected key. In some embodiments the checking is performed according to modified validity check expressions described elsewhere in this disclosure. In response to the projected key being valid, the method 400 performs block 412. In response to the projected key being invalid, the method 400 may be aborted.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of biometric authenticated key exchange for a communication session between a computing system and a system server, the method comprising:
    receiving at the computing system, a first biometric data set that is representative of a first biometric sample provided by a user;
    receiving, from a trusted third party server, public parameters;
    based on the public parameters and the first biometric data set, generating, at the computing system, a first set of exchange information that includes a randomized biometric of the first biometric data set and defined according to a first randomized biometric expression $x = b \oplus \text{Encode}(r)$;
    communicating, by the computing system, the first set of exchange information to the system server;
    receiving from the system server, a second set of exchange information, wherein the second set of exchange information includes a randomized biometric of a second biometric data set representative of a second biometric sample provided by the user and is defined according to a second randomized biometric expression $x' = b' \oplus \text{Encode}(r')$, and the public parameters include an error correcting code (ECC) that is defined to accommodate for a difference between the first biometric data set and the second biometric data set;
    computing a session key for the communication session, wherein the computing includes applying a first hash function based on a hash key generated at the computing system to a subset of the second set of exchange information and applying a second hash function based on a projected key generated at the system server to a subset of the first set of exchange information; and
    using the session key in communications between the computing system and the system server during the communication session,
    wherein:
    b represents the first biometric data set;
    b' represents the second biometric data set;
    Encode represents an ECC encoding operator; and
    Decode represents an ECC decoding operator
    x represents the randomized biometric of the first biometric data set;
    x' represents the randomized biometric of the second biometric data set;
    $\oplus$ represents an XOR operator;
    r' represents a random number sampled from a vector space $\{0,1\}^{k'}$;
    r represents a random number sampled from a vector space $\{0,1\}^{k}$;
    k' represents the hash key generated at the system server; and
    k represents the hash key generated at the computing system.

2. The method of claim 1, wherein:
    the ECC is defined according to an ECC expression:
    $(n', k', 2\delta'+1)$ ECC=(Encode, Decode); and
    a particular distance between the first biometric data set and the second biometric data set are defined according to a biometric distance expression:
    $\text{DIST}(b, b') < \delta'$, in which:
        DIST represents a hamming distance function;
        n' represents a length of code words used in the ECC expression;
        $2^{k'}$ represents a number of possible code words; and
        $\delta'$ represents a particular threshold value that indicates the first biometric data set and the second biometric data set are both from the user.

3. The method of claim 2, wherein:
    the public parameters are generated according to bilinear groups that are represented by a bilinear group expression $(p, G1, G2, GT, \hat{e})$;
    the first set of exchange information includes a projected key generated at the computing system, a modified ciphertext that is based on a modified public key and generated at the computing system, and the randomized biometric of the first biometric data set;
    the second set of exchange information includes a projected key generated at the system server, a modified ciphertext that is based on the modified public key and generated at the system server, and the randomized biometric of the second biometric data set;

the first set of exchange information and the second set of exchange information are generated according to modified exchange information expressions:

$EI1=(\alpha(k), C, x)$,
$EI2=(\alpha(k'), C', x')$,
$k \in Zp^5$,
$k' \in Zp^5$,
$\alpha(k) \in G1^2 \times G2^5$,
$\alpha(k') \in G1^2 \times G2^5$,
$r \leftarrow \{0,1\}^{k'}$,
$r' \leftarrow \{0,1\}^k$,
$C=ENCT_{pkm}(label, r) \in G1^4$,
$C'=ENCT_{pkm}(label', r') \in G1^4$,
$label=(P, P', \alpha(k), x)$, and
$label'=(P', P, \alpha(k'), x')$; and the modified public key is generated according to trapdoor smooth-projective hash function (TSPHF) key generation expressions:

$pkm=(G1, g1-1, g1-2, c, d, h, CRHASH)$,
$g1-1 \leftarrow G1$,
$g1-2 \leftarrow G1$,
$(x1, x2, y1, y2, z) \leftarrow Zp$,
$c=g1^{x1}g2^{x2}$,
$d=g1^{y1}g2^{y2}$, and
$h=g1^z$; in which:

EI1 represents the first set of exchange information;
EI2 represents the second set of exchange information;
k represents the hash key generated at the computing system;
k' represents the hash key generated at the system server;
$Zp^5$ represents a set of integers of a prime order of the bilinear groups;
α represents a smooth projective hash function;
C represents the modified ciphertext generated at the computing system;
C' represents the modified ciphertext generated at the system server;
ENCT represents an encryption operator of a TSPHF encryption scheme;
P represents a device identifier of the computing system;
P' represents a device identifier of the system server;
g1-1 represents a first generator drawn from the first bilinear group;
g1-2 represents a second generator drawn from the first bilinear group;
x1, x2, y1, y2, z represent integers drawn from the set of integers of the prime order;
c, d, and h represent intermediate generator parameters;
ϵ represents a membership operator;
× represents a product operator;
← represents a random-uniform drawing operator;
CRHASH represents a collision resistant hash function;
p represents the prime order of the bilinear groups;
G1 represents a first bilinear group;
G2 represents a second bilinear group;
GT represents an output bilinear group; and
ê represents a pairing operator.

4. The method of claim 3, wherein the hash key and the projected key are generated according to modified hash key generation expressions:

$k=(\eta1, \eta2, \theta, \mu, \nu)$,
$\eta1, \eta2, \theta, \mu, \nu \leftarrow Zp$,
$\alpha(k)=(k1, k2, k3)=(g1-1^{\eta1}g1-2^{\theta}h^{\mu}c^{\nu}, g1-1^{\eta2}d^{\nu}, k3) \in G1^2 \times G2^5$,
$k3=(\chi1-1, \chi1-2, \chi2, \chi3, \chi4) \in G2^5$,
$g2 \leftarrow G2$,
$\tau' \leftarrow Zp$,
$\zeta=g2^{\tau'}$,
$\chi1-1=\zeta^{\eta1}$,
$\chi1-2=\zeta^{\eta2}$,
$\chi2=\zeta^{\theta}$,
$\chi3=\zeta^{\mu}$, and
$\chi4=\zeta^{\nu}$; in which:

$\eta1, \eta2, \theta, \mu, \nu$ represent elements of the hash key;
k1 represents a first element of the projected key;
k2 represents a second element of the projected key;
k3 represent a third element of the projected key;
$\chi^{1-1}, \chi^{1-2}, \chi^2, \chi^3, \chi^4$ represent elements of the third element of the projected key;
τ' represents a trapdoor; and
ζ represents a second common random string.

5. The method of claim 4, further comprising checking a validity of the projected key, wherein the checking is performed according to modified validity check expressions:

$\hat{e}(k1, \zeta)\hat{e}(g1-1, \chi1-1)\cdot\hat{e}(g1-2, \chi2)\cdot\hat{e}(h, \chi3)\cdot\hat{e}(c, \chi4)$; and
$\hat{e}(k2, \zeta)\hat{e}(g1-1, \chi1-2)\cdot\hat{e}(d, \chi4)$.

6. The method of claim 5, wherein the computing is according to modified first hash function expressions, modified second hash function expressions, and modified computation expressions:

$skp=HASH_k(label', C', x')\cdot PROJHASH_{\alpha(k')}(label, C, x; w)$,
$r=Decode(x \oplus b)$,
$C=ENCT_{pkm}(label, r)=(u1, u2, e, v)$,
$HASH_k(label', C', x')=\hat{e}(u1^{(\eta1+\epsilon\eta2)}u2\theta (e/Gr(r))^{\mu}v^{\nu}, g2)$,
$PROJHASH_{\alpha(k')}(label, C, x; w)=\hat{e}((k1k2^{\epsilon})w, g2)$, and
$\epsilon=CRHASH(label, u1, u2, e)$, in which:

skp represents the session key;
$HASH_k$ represents a first hash function based on the hash key;
$PROJHASH_{\alpha(k')}$ represents a second hash function based on the projected key;
u1, u2, e, v represent elements of the modified ciphertext;
w represents a witness; and
Gr represents a reversible mapping of a Cramer Shoup encryption scheme.

7. The method of claim 2, wherein:

the first set of exchange information includes a projected key generated at the computing system, a ciphertext of the hash key that is based on a first public key and generated at the computing system, a zero knowledge proof that is generated at the computing system, a ciphertext of a label and a random number that is based on a second public key and generated at the computing system, and the randomized biometrics of the first biometric data set;

the second set of exchange information includes a projected key generated at the system server, a ciphertext based on the first public key of the hash key generated at the system server, a zero knowledge proof generated at the system server, a ciphertext based on the second public key of a label and a random number generated at the system server, and the randomized biometrics of the second biometric data set;

the first public key is a public key output by an unlabeled Cramer Shoup encryption scheme;

the second public key is a public key output by a labeled Cramer Shoup encryption scheme;

the first set of exchange information and the second set of exchange information are generated according to general exchange information expressions:

EI1=(s, c1, $\pi$, c2, x),
EI2=(s', c1', $\pi$', c2', x'),
k←K,
k'←K,
s=$\alpha$(k),
s'=$\alpha$(k'),
c1=ENC1$_{pk1}$(k),
c1'=ENC1$_{pk1}$(k'),
$\pi$=PCRS(s, c1)$\in$L,
$\pi$'=PCRS(s', c1')$\in$L',
label=(sid, P, P', s, c1, $\pi$),
label'=(sid, P', P, s', c1', $\pi$'),
r←$\{0,1\}^k$,
r'←$\{0, 1\}^{k'}$,
c2=ENC2$_{pk2}$ (label, r),
c2'=ENC2$_{pk2}$ (label', r'),
L'=$\{$(s', c1'):$\exists$k'$\in$K and w' such that s'=$\alpha$(k') and c1'=ENC1$_{pk1}$(k'; w')$\}$, and
L=$\{$(s, c1):$\exists$k$\in$K and w such that s=$\alpha$(k) and c1=ENC1$_{pk1}$(k; w)$\}$; in which
  EI1 represents the first set of exchange information;
  EI2 represents the second set of exchange information;
  s represents the projected key generated at the computing system;
  s' represents the projected key generated at the system server;
  c1 represents the ciphertext of the hash key generated at the computing system;
  c1' represents the ciphertext of the hash key generated at the system server;
  $\pi$ represents the zero knowledge proof generated at the computing system;
  $\pi$' represents the zero knowledge proof generated at the system server;
  c2 represents the ciphertext of the label and the random number generated at the computing system;
  c2' represents the ciphertext of the label and the random number generated at the system server;
  k represents the hash key generated at the computing system;
  k' represents the hash key generated at the system server;
  K represents a keyspace;
  $\alpha$ represents a smooth projective hash function;
  ENC1$_{pk1}$ represents an encryption operator based on the first public key that is included in the unlabeled Cramer Shoup encryption scheme;
  PCRS ( ) represents a simulation sound non-interactive zero-knowledge (NIZK);
  L represents a language;
  L' represents a language;
  sid represents a session identifier;
  P represents a device identifier of the computing system;
  P' represents a device identifier of the system server;
  r represents a random number generated at the computing system;
  r' represents a random number generated at the system server;
  $\{0,1\}^k$ represents a binary vector space having a dimension of the hash key generated at the computing system;
  $\{0,1\}^{k'}$ represents a binary vector space having a dimension of the hash key generated at the system server;
  ENC2$_{pk2}$ represents an encryption operator based on the second public key that is included in the labeled Cramer Shoup encryption scheme;
  $\exists$ represents an "at least one element exists" operator;
  w' represents a witness for the system server;
  w represents a witness for the computing system;
  $\in$ represents a membership operator; and
  ← represents a random-uniform drawing operator.

8. The method of claim 7, wherein the hash key and the projected key are generated according to hash key generation expressions:

Gc (p);
(g1, g2)←Gc;
$\eta$1, $\eta$2, $\theta$, $\mu$, $\nu$←Zp;
k=($\eta$1, $\eta$2, $\theta$, $\mu$, $\nu$);
c=g1$^{\eta 1}$g2$^{\eta 2}$;
d=g1$^\theta$g2$^\mu$;
h=g1$^\nu$; and
$\alpha$(k)=(k1, k2)=(g1$^{\eta 1}$g2$^\theta$h$^\mu$c$^\nu$, g$^{\eta 2}$d$^\nu$), in which:
  Gc represents a cyclic group;
  g1 and g2 represent generators drawn from the cyclic group;
  Zp represents a set of integers of a prime order of the cyclic group;
  $\eta$1, $\eta$2, $\theta$, $\mu$, $\nu$ represent integers sampled from the set of integers;
  c, d, and h represent intermediate generator parameters;
  k1 represents a first element of the projected key; and
  k2 represents a second element of the projected key.

9. The method of claim 8, wherein the computing is according to general computation expressions, general first hash function expressions, and general second hash function expressions:

skp=HASH$_k$ (label', c2', x')·PROJHASH$_{\alpha(k')}$ (label, c2, x),
r'=Decode (x'$\oplus$b),
c2=ENC2$_{pk2}$ (label, r)=(u1, u2, e, v),
pk2=(Gc, g1, g2, c, d, h, CRHASH)
HASH$_k$ (label', c2', x')=u1$^{(\eta 1' \varepsilon \eta 2)}$u2$^\theta$(e/Gr)$^\mu$v$^\nu$
PROJHASH$_{\alpha(k')}$(label, c2, x; w)=(k1k2$^\varepsilon$)$^w$, and
$\varepsilon$=CRHASH (label, u1, u2, e), in which
  skp represents the session key;
  HASH$_k$ represents a first hash function based on the hash key;
  PROJHASH$_{\alpha(k')}$ represents a second hash function based on the projected key;
  u1, u2, e, v represent elements of the ciphertext of the label and the random number generated at the computing system;
  CRHASH represents a collision resistant hash function; and
  Gr represents a reversible mapping of a Cramer Shoup encryption scheme.

10. A non-transitory computer-readable medium having encoded therein programming code executable by a processor to perform operations comprising:

receiving at a computing system, a first biometric data set that is representative of a first biometric sample provided by a user;

receiving, from a trusted third party server, public parameters;

based on the public parameters and the first biometric data set, generating, at the computing system, a first set of exchange information that includes a randomized biometric of the first biometric data set and defined according to a first randomized biometric expression $x=b\oplus\text{Encode}(r)$;

communicating, by the computing system, the first set of exchange information to a system server;

receiving from the system server, a second set of exchange information, wherein the second set of exchange information includes a randomized biometric of a second biometric data set representative of a second biometric sample provided by the user and is defined according to a second randomized biometric expression $x'=b'\oplus\text{Encode}(r')$, and the public parameters include an error correcting code (ECC) that is defined to accommodate for a difference between the first biometric data set and the second biometric data set;

computing a session key for the communication session, wherein the computing includes applying a first hash function based on a hash key generated at the computing system to a subset of the second set of exchange information and applying a second hash function based on a projected key generated at the system server to a sub set of the first set of exchange information; and using the session key in communications between the computing system and the system server during the communication session, wherein:
b represents the first biometric data set;
b' represents the second biometric data set;
Encode represents an ECC encoding operator; and
Decode represents an ECC decoding operator;
x represents the randomized biometric of the first biometric data set;
x' represents the randomized biometric of the second biometric data set;
$\oplus$ represents an XOR operator;
r' represents a random number sampled from a vector space $\{0, 1\}k'$;
r represents a random number sampled from a vector space $\{0, 1\}k$;
k' represents the hash key generated at the system server; and
k represents the hash key generated at the computing system.

11. The non-transitory computer-readable medium of claim 10, wherein:
the ECC is defined according to an ECC expression:
(n', k', 2δ'+1) ECC=(Encode, Decode); and
a particular distance between the first biometric data set and the second biometric data set are defined according to a biometric distance expression:
DIST (b, b')<δ', in which:
DIST represents a hamming distance function;
n' represents a length of code words used in the ECC expression;
2^k' represents a number of possible code words; and
δ' represents a particular threshold value that indicates the first biometric data set and the second biometric data set are both from the user.

12. The non-transitory computer-readable medium of claim 11, wherein:
the public parameters are generated according to bilinear groups that are represented by a bilinear group expression (p, G1, G2, GT, ê);
the first set of exchange information includes a projected key generated at the computing system, a modified ciphertext that is based on a modified public key and generated at the computing system, and the randomized biometric of the first biometric data set;
the second set of exchange information includes a projected key generated at the system server, a modified ciphertext that is based on the modified public key and generated at the system server, and the randomized biometric of the second biometric data set;
the first set of exchange information and the second set of exchange information are generated according to modified exchange information expressions:
EI1=(α(k), C, x),
EI2=(α(k'), C', x'),
k∈$Zp^5$,
k'∈$Zp^5$,
α(k)∈$G1^2 \times G2^5$,
α(k')∈$G1^2 \times G2^5$,
r←$\{0,1\}^{k'}$,
r'←$\{0,1\}^{k}$,
C=$\text{ENCT}_{pkm}$ (label, r)∈$G1^4$,
C'=$\text{ENCT}_{pkm}$ (label', r')∈$G1^4$,
label=(P, P', α(k), x), and
label'=(P', P, α(k'), x'); and the modified public key is generated according to trapdoor smooth-projective hash function (TSPHF) key generation expressions:
pkm=(G1, g1-1, g1-2, c, d, h, CRHASH),
g1-1←G1,
g1-2←G1,
(x1, x2, y1, y2, z)←Zp,
c=$g1^{x1}g2^{x2}$,
d=$g1^{y1}g2^{y2}$, and
h=$g1^z$; in which:
EI1 represents the first set of exchange information;
EI2 represents the second set of exchange information;
k represents the hash key generated at the computing system;
k' represents the hash key generated at the system server;
$Zp^5$ represents a set of integers of a prime order of the bilinear groups;
α represents a smooth projective hash function;
C represents the modified ciphertext generated at the computing system;
C' represents the modified ciphertext generated at the system server;
ENCT represents an encryption operator of a TSPHF encryption scheme;
P represents a device identifier of the computing system;
P' represents a device identifier of the system server;
g1-1 represents a first generator drawn from the first bilinear group;
g1-2 represents a second generator drawn from the first bilinear group;
x1, x2, y1, y2, z represent integers drawn from the set of integers of the prime order;
c, d, and h represent intermediate generator parameters;
∈ represents a membership operator;
× represents a product operator;
← represents a random-uniform drawing operator;
CRHASH represents a collision resistant hash function;
p represents the prime order of the bilinear groups;
G1 represents a first bilinear group;
G2 represents a second bilinear group;

GT represents an output bilinear group; and
ê represents a pairing operator.

13. The non-transitory computer-readable medium of claim 12, wherein the hash key and the projected key are generated according to modified hash key generation expressions:

$k=(\eta 1, \eta 2, \theta, \mu, \nu)$,
$\eta 1, \eta 2, \theta, \mu, \nu \leftarrow Zp$,
$\alpha(k)=(k1, k2, k3)=(g1\text{-}1^{\eta 1}\text{-}g1\text{-}2^{\theta}h^{\mu}c^{\nu}, g1\text{-}1^{\eta 2}d^{\nu}, k^3) \in G1^2 \times G2^5$,
$k3=(\chi^{1\text{-}1}, \chi^{1\text{-}2}, \chi^2, \chi^3, \chi^4) \in G2^5$,
$g2 \leftarrow G2$,
$\tau' \leftarrow Zp$,
$\zeta = g2\tau'$,
$\chi^{1\text{-}1} = \zeta^{\eta 1}$,
$\chi^{1\text{-}2} = \zeta^{\eta 2}$,
$\chi 2 = \zeta^{\theta}$,
$\chi 3 = \zeta^{\mu}$, and
$\chi 4 = \zeta^{\nu}$; in which:
  $\eta 1, \eta 2, \theta, \mu, \nu$ represent elements of the hash key;
  k1 represents a first element of the projected key;
  k2 represents a second element of the projected key;
  k3 represent a third element of the projected key;
  $\chi^{1\text{-}1}, \chi^{1\text{-}2}, \chi^2, \chi^3, \chi^4$ represent elements of the third element of the projected key;
  $\tau'$ represents a trapdoor; and
  $\zeta$ represents a second common random string.

14. The non-transitory computer-readable medium of claim 13, wherein:
  the operations further comprise checking the validity of the projected key; and
  the checking is performed according to modified validity check expressions:
  $\hat{e}(k1, \zeta)\hat{e}(g1\text{-}1, \chi 1\text{-}1) \cdot \hat{e}(g1\text{-}2, \chi 2) \cdot \hat{e}(h, \chi 3) \cdot \hat{e}(c, \chi 4)$; and
  $\hat{e}(k2, \zeta)\hat{e}(g1\text{-}1, \chi 1\text{-}2) \cdot \hat{e}(d, \chi 4)$.

15. The non-transitory computer-readable medium of claim 14, wherein the computing is according to modified first hash function expressions, modified second hash function expressions, and modified computation expressions:
  $skp=HASH_k(label', C', x') \cdot PROJHASH_{\alpha(k')}(label, C, x; w)$,
  $r=Decode(x \oplus b)$,
  $C=ENCT_{pkm}(label, r)=(u1, u2, e, v)$,
  $HASH_k(label', C', x')=\hat{e}(u1^{(\eta 1+\epsilon \eta 2)}u2^{\theta}(e/Gr(r))^{\mu}v^{\nu}, g2)$,
  $PROJHASH_{\alpha(k')}(label, C, x; w)=\hat{e}((k1k2^{\epsilon})^w, g2)$, and
  $\epsilon=CRHASH(label, u1, u2, e)$, in which:
  skp represents the session key;
  $HASH_k$ represents a first hash function based on the hash key;
  $PROJHASH_{\alpha(k')}$ represents a second hash function based on the projected key;
  u1, u2, e, v represent elements of the modified ciphertext;
  w represents a witness; and
  Gr represents a reversible mapping of a Cramer Shoup encryption scheme.

16. The non-transitory computer-readable medium of claim 11, wherein:
  the first set of exchange information includes a projected key generated at the computing system, a ciphertext of the hash key that is based on a first public key and generated at the computing system, a zero knowledge proof that is generated at the computing system, a ciphertext of a label and a random number that is based on a second public key and generated at the computing system, and the randomized biometrics of the first biometric data set;

the second set of exchange information includes a projected key generated at the system server, a ciphertext based on the first public key of the hash key generated at the system server, a zero knowledge proof generated at the system server, a ciphertext based on the second public key of a label and a random number generated at the system server, and the randomized biometrics of the second biometric data set;

the first public key is a public key output by an unlabeled Cramer Shoup encryption scheme;

the second public key is a public key output by a labeled Cramer Shoup encryption scheme;

the first set of exchange information and the second set of exchange information are generated according to general exchange information expressions:

$EI1=(s, c1, \pi, c2, x)$,
$EI2=(s', c1', \pi', c2', x')$,
$k \leftarrow K$,
$k' \leftarrow K$,
$s=\alpha(k)$,
$s'=\alpha(k')$,
$c1=ENC1_{pk1}(k)$,
$c1'=ENC1_{pk1}(k')$,
$\pi=PCRS(s, c1) \in L$,
$\pi'=PCRS(s', c1') \in L'$,
$label=(sid, P, P', s, c1, \pi)$,
$label'=(sid, P', P, s', c1', \pi')$,
$r \leftarrow \{0,1\}^k$,
$r' \leftarrow \{0, 1\}^{k'}$,
$c2=ENC2_{pk2}(label, r)$,
$c2'=ENC2_{pk2}(label', r')$,
$L'=\{(s', c1'): \exists k' \in K$ and $w'$ such that $s'=\alpha(k')$ and $c1'=ENC1pk1(k'; w')\}$, and
$L=\{(s, c1): \exists k \in K$ and $w$ such that $s=\alpha(k)$ and $c1=ENC1_{pk1}(k; w)\}$; in which
  EI1 represents the first set of exchange information;
  EI2 represents the second set of exchange information;
  s represents the projected key generated at the computing system;
  s' represents the projected key generated at the system server;
  c1 represents the ciphertext of the hash key generated at the computing system;
  c1' represents the ciphertext of the hash key generated at the system server;
  $\pi$ represents the zero knowledge proof generated at the computing system;
  $\pi'$ represents the zero knowledge proof generated at the system server;
  c2 represents the ciphertext of the label and the random number generated at the computing system;
  c2' represents the ciphertext of the label and the random number generated at the system server;
  k represents the hash key generated at the computing system;
  k' represents the hash key generated at the system server;
  K represents a keyspace;
  $\alpha$ represents a smooth projective hash function;
  $ENC1_{pk1}$ represents an encryption operator based on the first public key that is included in the unlabeled Cramer Shoup encryption scheme;
  PCRS ( ) represents a simulation sound non-interactive zero-knowledge (NIZK);

L represents a language;
L' represents a language;
sid represents a session identifier;
P represents a device identifier of the computing system;
P' represents a device identifier of the system server;
r represents a random number generated at the computing system;
r' represents a random number generated at the system server;
$\{0,1\}^k$ represents a binary vector space having a dimension of the hash key generated at the computing system;
$\{0,1\}^{k'}$ represents a binary vector space having a dimension of the hash key generated at the system server;
$ENC2_{pk2}$ represents an encryption operator based on the second public key that is included in the labeled Cramer Shoup encryption scheme;
$\exists$ represents an "at least one element exists" operator;
w' represents a witness for the system server;
w represents a witness for the computing system;
$\in$ represents a membership operator; and
$\leftarrow$ represents a random-uniform drawing operator.

17. The non-transitory computer-readable medium of claim 16, wherein the hash key and the projected key are generated according to hash key generation expressions:
Gc (p);
$(g1, g2) \leftarrow Gc$;
$\eta 1, \eta 2, \theta, \mu, \nu \leftarrow Zp$;
$k=(\eta 1, \eta 2, \theta, \mu, \nu)$;
$c=g1^{\eta 1}g2^{\eta 2}$;
$d=g1^{\theta}g2^{\mu}$;
$h=g1^{\nu}$; and
$\alpha(k)=(k1, k2)=(g1^{\eta 1}g2^{\theta}h^{\mu}c^{\nu}, g^{\eta 2}d^{\nu})$, in which:
Gc represents a cyclic group;
g1 and g2 represent generators drawn from the cyclic group;
Zp represents a set of integers of a prime order of the cyclic group;
$\eta 1, \eta 2, \theta, \mu, \nu$ represent integers sampled from the set of integers;
c, d, and h represent intermediate generator parameters;
k1 represents a first element of the projected key; and
k2 represents a second element of the projected key.

18. The non-transitory computer-readable medium of claim 17, wherein the computing is according to general computation expressions, general first hash function expressions, and general second hash function expressions:
$skp=HASH_k$ (label', c2', x')·$PROJHASH_{\alpha(k')}$ (label, c2, x),
r'=Decode (x'⊕b),
$c2=ENC2_{pk2}$ (label, r)=(u1, u2, e, v),
pk2=(Gc, g1, g2, c, d, h, CRHASH)
$HASH_k$ (label', c2', x')=$u1^{(\eta 1+\epsilon \eta 2)}u2^{\theta}(e/Gr)^{\mu}v^{\nu}$
$PROJHASH_{\alpha(k')}$(label, c2, x; w)=$(k1k2^{\epsilon})^w$, and
$\epsilon$=CRHASH (label, u1, u2, e), in which
skp represents the session key;
$HASH_k$ represents a first hash function based on the hash key;
$PROJHASH_{\alpha(k')}$ represents a second hash function based on the projected key;
u1, u2, e, v represent elements of the ciphertext of the label and the random number generated at the computing system;
CRHASH represents a collision resistant hash function; and
Gr represents a reversible mapping of a Cramer Shoup encryption scheme.

* * * * *